United States Patent
Dodov et al.

(10) Patent No.: US 12,067,573 B2
(45) Date of Patent: Aug. 20, 2024

(54) METHOD, COMPUTER, AND PROGRAM FOR ARTWORK MANAGEMENT

(71) Applicant: Wacom Co., Ltd., Saitama (JP)

(72) Inventors: Lachezar Sashov Dodov, Sofia (BG); Andreas Ludwig, Dusseldorf (DE)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 17/975,072

(22) Filed: Oct. 27, 2022

(65) Prior Publication Data

US 2023/0044309 A1 Feb. 9, 2023

Related U.S. Application Data

(63) Continuation of application No. PCT/JP2021/017839, filed on May 11, 2021.

(30) Foreign Application Priority Data

May 21, 2020 (JP) ................. 2020-088630

(51) Int. Cl.
  *G06Q 20/12* (2012.01)
  *G06Q 20/38* (2012.01)
  *G06Q 20/40* (2012.01)
  *G06Q 50/18* (2012.01)

(52) U.S. Cl.
  CPC ....... *G06Q 20/4016* (2013.01); *G06Q 20/389* (2013.01); *G06Q 50/184* (2013.01)

(58) Field of Classification Search
  None
  See application file for complete search history.

(56) References Cited

U.S. PATENT DOCUMENTS

| 2004/0109608 A1 | 6/2004 | Love et al. |
| 2017/0353309 A1 | 12/2017 | Gray |
| 2019/0294761 A1 | 9/2019 | Kim et al. |

(Continued)

FOREIGN PATENT DOCUMENTS

| JP | 2019-524018 A | 8/2019 | |
| WO | WO-0182263 A1 * | 11/2001 | ............. G09B 11/10 |
| WO | 2015024129 A1 | 2/2015 | |

OTHER PUBLICATIONS

Partial European Search Report dated Oct. 13, 2023, for the corresponding European Patent Application No. 21807836.8, 16 pages.

(Continued)

*Primary Examiner* — Joseph W. King
(74) *Attorney, Agent, or Firm* — Seed IP Law Group LLP

(57) ABSTRACT

An artwork management method executed by one or more computers is provided. The artwork management method includes detecting, by a first computer included in the one or more computers, artwork included in a website, determining, by the first computer, whether or not a purchase transaction indicating purchase of the artwork detected is recorded in a blockchain network, and transmitting, by the first computer, a report indicating discovery of unauthorized use of the artwork, in a case where the first computer determines that the purchase transaction is not recorded. According to one aspect, the artwork management method suppresses illegal use of artwork while maintaining accessibility of the artwork.

12 Claims, 17 Drawing Sheets

(56) References Cited

U.S. PATENT DOCUMENTS

2020/0134585 A1    4/2020  Xu et al.
2020/0319714 A1*  10/2020  Boydston ................ G06F 3/017

OTHER PUBLICATIONS

International Search Report, mailed Aug. 17, 2021, for International Application No. PCT/JP2021/017839, 4 pages.
Extended European Search Report dated Apr. 16, 2024, for the corresponding European Patent Application No. 21807836.8, 17 pages.

* cited by examiner

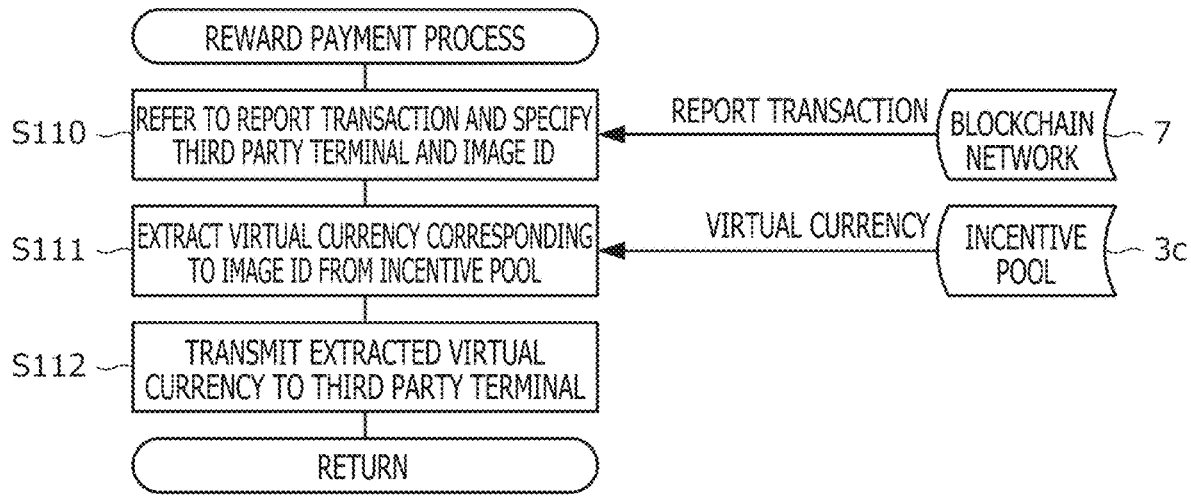
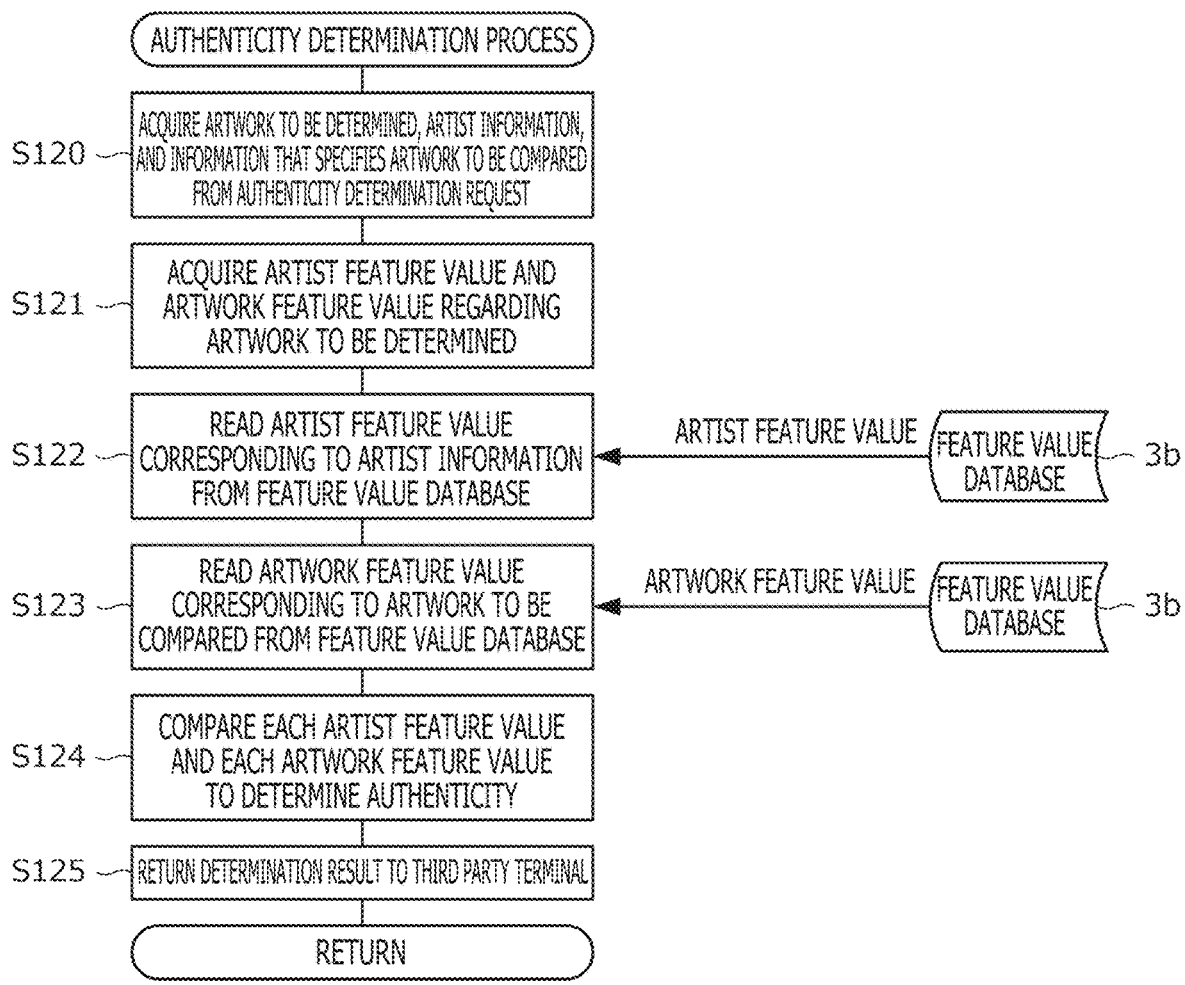

METHOD, COMPUTER, AND PROGRAM FOR ARTWORK MANAGEMENT

TECHNICAL FIELD

The present invention relates to a method, computer and program for artwork management.

BACKGROUND ART

In recent years, a smart contract, which through use of a blockchain guarantees the legitimacy of a contract, is used to offer various services. For example, Patent Document 1 discloses use of a smart contract in bank lending services.

PRIOR ART DOCUMENT

Patent Document

Patent Document 1: Japanese National Publication of International Patent Application No. 2019-524018

SUMMARY OF INVENTION

Technical Problem

By the way, a technique called DRM (Digital Rights Management) is known which is designed to restrict reproduction of a digital image to protect its copyright holder's rights in the digital image. The technique can be used to also restrict illegal use, such as unauthorized use, of artwork such as digital painting drawn on a tablet terminal. On the other hand, accessibility to the artwork is lost. As a result, the rights of an artist as a copyright holder of the artwork may too be lost, needing improvement.

Therefore, an object of the present invention is to provide a method, computer, and program for artwork management, which can restrict illegal use of artwork while maintaining accessibility of the artwork.

Technical Solution

The present invention provides an artwork management method executed by one or more computers. The artwork management method includes a detection step of detecting, by a first computer included in the one or more computers, artwork included in a website, a determination step of determining, by the first computer, whether or not a purchase transaction indicating purchase of the artwork detected in the detection step is recorded in a blockchain network, and a transmission step of transmitting, by the first computer, a report indicating discovery of unauthorized use of the artwork, in a case where the first computer determines, in the determination step, that the purchase transaction is not recorded.

The present invention provides a computer including a detection unit that detects artwork included in a website, a determination unit that determines whether or not a purchase transaction indicating purchase of the artwork detected by the detection unit is recorded in a blockchain network, and a transmission unit that transmits a report indicating discovery of unauthorized use of the artwork, in a case where the determination unit determines that the purchase transaction is not recorded.

The present invention provides a program which causes a computer to execute a detection step of detecting artwork included in a website, a determination step of determining whether or not a purchase transaction indicating purchase of the artwork detected in the detection step is recorded in a blockchain network, and a transmission step of transmitting a report indicating discovery of unauthorized use of the artwork, in a case where the computer determines, in the determination step, that the purchase transaction is not recorded.

Advantageous Effects of Invention

According to the present invention, illegal use of artwork can be suppressed while accessibility to the artwork is maintained.

BRIEF DESCRIPTION OF DRAWINGS

FIG. 19 is a diagram illustrating details of a reward payment process executed in step S9 of FIG. 12.

FIG. 20 is a diagram illustrating details of an authenticity determination process executed in step S10 of FIG. 12.

EMBODIMENTS FOR CARRYING OUT THE INVENTION

Hereinafter, embodiments of the present invention will be described in detail with reference to the attached drawings.

Figure 1:
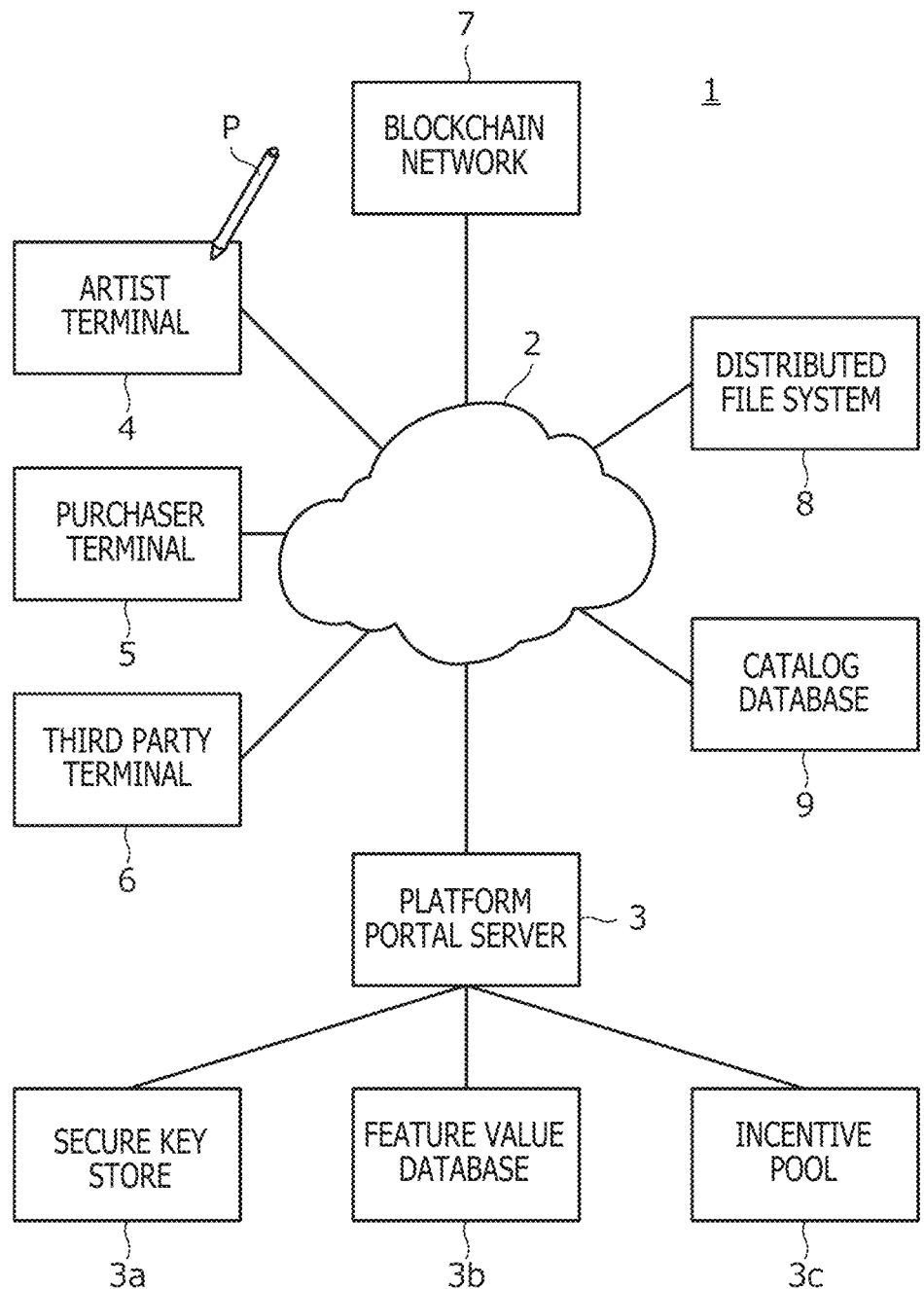
FIG. 1 is a diagram illustrating a configuration of an artwork trade and management system 1 according to an embodiment of the present invention.

FIG. 1 is a diagram illustrating a configuration of an artwork trade and management system 1 according to a present embodiment. As illustrated in FIG. 1, the artwork trade and management system 1 includes a platform portal server 3, an artist terminal 4, a purchaser terminal 5, a third party terminal 6, a blockchain network 7, a distributed file system 8, and a catalog database 9 that are connected to each other through a network 2. In addition, a secure key store 3a, a feature value database 3b, and an incentive pool 3c are connected to the platform portal server 3.

Figure 2:
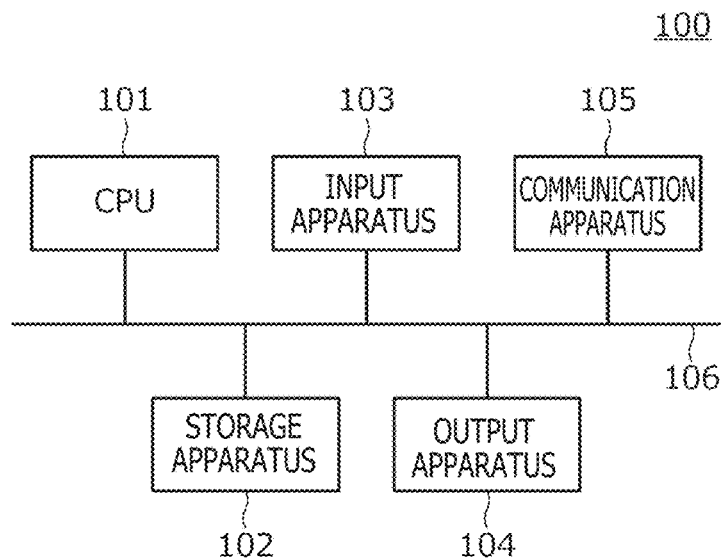
FIG. 2 is a diagram illustrating an example of a hardware configuration of a platform portal server 3, an artist terminal 4, and a purchaser terminal 5.

FIG. 2 is a diagram illustrating an example of a hardware configuration of the platform portal server 3, the artist terminal 4, the purchaser terminal 5, and the third party terminal 6. The platform portal server 3, the artist terminal 4, the purchaser terminal 5, and the third party terminal 6 can each include a computer 100 having the illustrated configuration.

As illustrated in FIG. 2, the computer 100 includes a CPU (Central Processing Unit) 101, a storage apparatus 102, an input apparatus 103, an output apparatus 104, and a communication apparatus 105.

The CPU 101 is an apparatus that controls each component of the computer 100 and that reads and executes various programs stored in the storage apparatus 102. The CPU 101 of the platform portal server 3 executes a program stored in the storage apparatus 102 to execute processes described with reference to FIGS. 12 to 17, 19, and 20 to be described later. In addition, the CPU 101 of the third party terminal 6 executes a program (a plug-in, to be described later) stored in the storage apparatus 102 to execute a process described with reference to FIG. 18 described later.

The storage apparatus 102 includes a main storage apparatus, such as a DRAM (Dynamic Random Access Memory), and an auxiliary storage apparatus, such as a hard disk. The storage apparatus 102 stores various programs for executing an operating system of the computer 100 and various applications and stores data used by the programs. An artificial intelligence program for unsupervised learning based on deep learning is stored in advance in the storage apparatus 102 of the platform portal server 3, and the platform portal server 3 executes the artificial intelligence program to also function as a machine learning apparatus.

The input apparatus 103 is an apparatus that receives an input operation of a user and supplies the input operation to the CPU 101. The input apparatus 103 includes, for example, a keyboard, a mouse, and a touch detection apparatus. Of these, the touch detection apparatus is an apparatus including a touch sensor and a touch controller and is used for detecting pen input or touch input. The pen input is performed based on, for example, an active capacitive system or an electromagnetic resonance system. The touch input is performed based on, for example, a capacitance system.

The output apparatus 104 is an apparatus that outputs a processing result of the CPU 101 to the user. The output apparatus 104 includes, for example, a display and a speaker. The communication apparatus 105 is an apparatus for communicating with an external apparatus. The communication apparatus 105 transmits and receives data according to an instruction of the CPU 101. The transmission and reception of data among the platform portal server 3, the artist terminal 4, the purchaser terminal 5, and the third party terminal 6 are performed by mutual communication of their communication apparatuses 105.

FIG. 1 will be further described. The artist terminal 4 is a computer used by an artist to input and exhibit artwork and to input biometric signature data to be described later. The artwork and the biometric signature data are digital data and are generated by the artist using a pen P to perform pen input to the input apparatus 103 of the artist terminal 4. A specific process of exhibition of the artwork will be described later.

An input method of the artwork will be described. The touch detection apparatus of the artist terminal 4 is configured to be capable of detecting the pen P which is present near the touch surface. While the pen P is detected, the touch detection apparatus periodically acquires coordinate data indicating the position of the pen P in the touch surface, a pen pressure value indicating the pressure applied to a pen tip of the pen P, and pen angle data indicating the tilt of the pen P relative to the touch surface, and the touch detection apparatus supplies the acquired data to the CPU 101.

The coordinate data is data indicating the position of the pen P detected by the touch detection apparatus. An example of performing the pen input based on the active capacitive system will be described in detail. First, the touch sensor includes a plurality of X-electrodes that extend in a Y-direction and that are arranged at equal intervals in an X-direction, and includes a plurality of Y-electrodes that extend in the X-direction and that are arranged at equal intervals in the Y-direction. The touch controller receives burst signals transmitted from the pen P via the plurality of X-electrodes and the plurality of Y-electrodes to thereby acquire the coordinate data indicating the position of the pen P.

The pen pressure value is data detected by, for example, a pressure sensor built in the pen P. In addition, the pen angle data is data detected by, for example, a tilt sensor built in the pen P. The pen P supportive of the active capacitive system can transmit a data signal to the paired touch controller, and the pen P transmits the pen pressure value and the pen angle data through the data signal.

Figure 3:
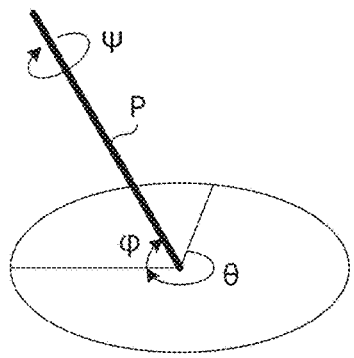
FIG. 3 is a diagram describing pen angle data.

FIG. 3 is a diagram describing the pen angle data. As illustrated in FIG. 3, the pen angle data includes an azimuth $\theta$, a tilt angle $\Phi$, and an angle of rotation $\psi$. Of these, the tilt angle $\Phi$ may be detected by the touch controller on the basis of the signal transmitted from the pen P. In this case, the pen P has a configuration that includes two electrodes arranged side by side in a pen axis direction, and the pen P transmits a burst signal from each electrode. The touch detection apparatus detects the tilt angle $\Phi$ on the basis of the positions of the reception of two burst signals transmitted from the two electrodes.

FIG. 1 will be further described. The CPU 101 of the artist terminal 4 determines whether or not the pen tip of the pen P is in contact with the touch surface, on the basis of the pen pressure value supplied from the touch detection apparatus. The CPU 101 then generates stroke data by using a series of coordinate data, and the like, acquired when the pen P is in the touch state. The CPU 101 stores the stroke data in the storage apparatus 102 and displays the stroke data on a display included in the output apparatus 104. The artwork includes a digital ink file including the series of stroke data stored in the storage apparatus 102 in this way. Each piece of the stroke data is data including a series of combinations of coordinate data, pen pressure value, and pen angle data and including time stamp information indicating the time at which the touch detection apparatus has acquired the respective combinations of data.

Figure 4:
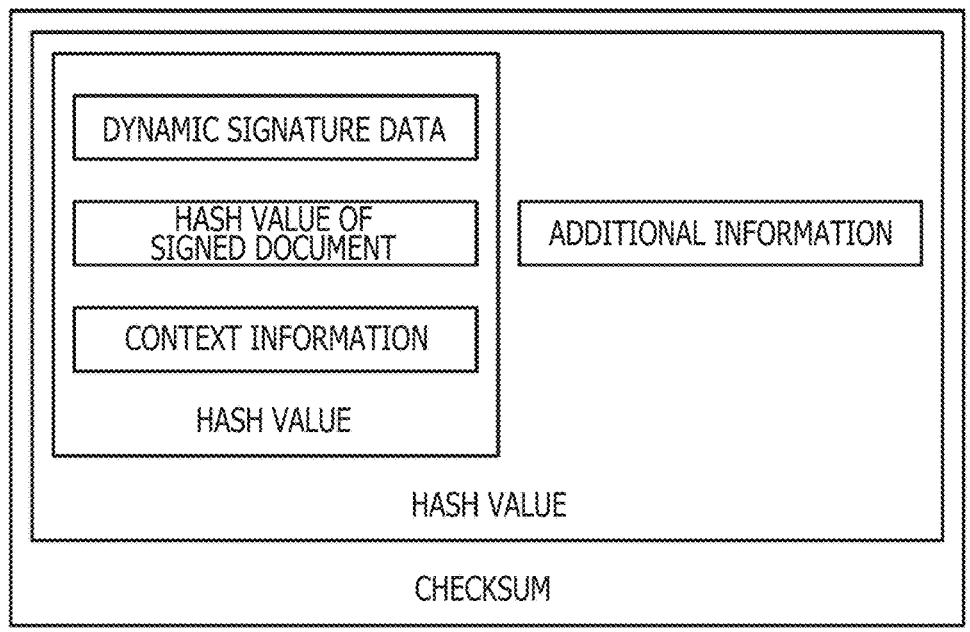
FIG. 4 is a diagram illustrating a configuration of biometric signature data.

FIG. 4 is a diagram illustrating a configuration of the biometric signature data. The biometric signature data is data generated according to, for example, WILL (Wacom Ink Layer Language) or FSS (Forensic Signature Stream). As illustrated in FIG. 4, the biometric signature data includes dynamic signature data, a hash value of a signed document, context information, and additional information.

The biometric signature data also includes a hash value of the dynamic signature data, the hash value of the signed document, and the context information, as illustrated. The biometric signature data also includes a hash value of said hash value and the additional information, as well as a checksum for detecting an error that may occur in the transmission and reception of the hash value. Of these, the dynamic signature data, similar to artwork, is formed of a digital ink file including a series of stroke data.

The hash value of the signed document is a hash value of electronic data of a document (such as an exhibition application and a contract) signed by the artist to generate the biometric signature data. Note that the hash value is a value obtained by input of the target electronic data to a predetermined one-way hash function. This aspect is the same with other hash values to be described later.

The context information is information including name data of the signed artist, date of signing, a purpose for signing, information regarding the touch detection apparatus used for signing (such as a manufacturer name and a model name), information regarding an application used for signing (such as an application name and version information), information regarding an operating system of the artist terminal 4 (such as an operating system name and version information), address information of the artist terminal 4 (such as an IP (Internet Protocol) address and a MAC (Media Access Control) address), and the like. The additional information is information, besides the dynamic signature data, the hash value of the signed document, and the context information, which can freely be designated by an administrator of the artwork trade and management system 1.

FIG. 1 will be further described. The purchaser terminal 5 is a computer used by a purchaser to purchase the artwork (artwork exhibited by the artist). A specific process of purchase will be described later.

The third party terminal 6 is a computer of a third party from the viewpoint of the administrator of the artwork trade and management system 1, and the third party terminal 6 plays a role of monitoring illegal use, such as unauthorized use, of the artwork and reporting the unauthorized use in a case where unauthorized use is discovered. The monitoring is executed by, for example, a plug-in installed on browser software. In addition, the third party terminal 6 also plays a role of requesting the platform portal server 3 to determine authenticity of the artwork. Specific processes of the monitoring and the authenticity determination will be described later.

The blockchain network 7 is a network of a plurality of computers connected peer-to-peer and is configured to record a transaction of a smart contract in a blockchain. A specific example of the blockchain network 7 includes an Ethereum network. The transaction is recorded in the blockchain by some computers connected to the blockchain network 7 (hereinafter referred to as "miners").

Specifically, each block included in the blockchain includes a block header and data (trade data) indicating specifics of the transaction. Of these, the block header includes a Merkle route, which is data obtained by compressing the size of the trade data, a hash value of the previous block, and a nonce value that is any character string. A rule is set in the blockchain network 7 such that, to connect a new block to the blockchain, the hash value of the block needs to satisfy a predetermined condition (for example, a condition that the value starts with "000"). Therefore, the miners trying to record a block in the blockchain perform operation of finding (mining) the nonce value in a round-robin manner such that the hash value of the block header of the block satisfies the predetermined condition described above. As a result of the operation, the miner that first successfully discovers the nonce value connects the block to the blockchain to complete the recording of the transaction in the blockchain.

The distributed file system 8 is a network of a plurality of computers connected peer-to-peer and is configured to store any electronic data. A specific example of the distributed file system 8 includes IPFS (InterPlanetary File System). The electronic data stored in the distributed file system 8 is identified by a hash value of the electronic data. That is, the hash value of the stored electronic data functions as address information of the electronic data in the distributed file system 8. In the present embodiment, the distributed file system 8 is used for storing encrypted artwork.

The catalog database 9 is a database mounted on one or a plurality of computers. In the present embodiment, the catalog database 9 is used for storing a catalog of the artwork (information necessary for sale). The catalog database 9 may be mounted in the platform portal server 3.

The secure key store 3a is a database for storing encryption keys used for encrypting data. The secure key store 3a is configured in advance to accept access only from the platform portal server 3. In the present embodiment, the secure key store 3a is used for storing public keys 1 and 2, private keys 1 and 2, and data encryption keys 1 and 2 to be described later.

The feature value database 3b is a database that stores an artist feature value indicating features of artwork production of the artist and an artwork feature value including a plurality of values indicating features of the artwork. Details of the feature values will be described later. The feature value database 3b is also configured in advance to accept access only from the platform portal server 3.

The incentive pool 3c is a database for storing money to be provided as an incentive to the third party terminal 6 that has transmitted a discovery report of illegal use, such as unauthorized use, of the artwork. The money may be, for example, virtual currency (such as Ether) supported by the blockchain network 7. The incentive pool 3c is also configured in advance to accept access only from the platform portal server 3.

The platform portal server 3 is a computer that functions as an artwork trading apparatus. The platform portal server 3 plays a role of accepting exhibition of artwork by the artist and realizing purchase of the exhibited artwork. In addition, the platform portal server 3 monitors unauthorized use of the artwork through the third party terminal 6 and also plays a role of acquiring and managing the artist feature value and the artwork feature value and using the managed artist feature value and artwork feature value to determine the authenticity of the artwork.

Figure 5:
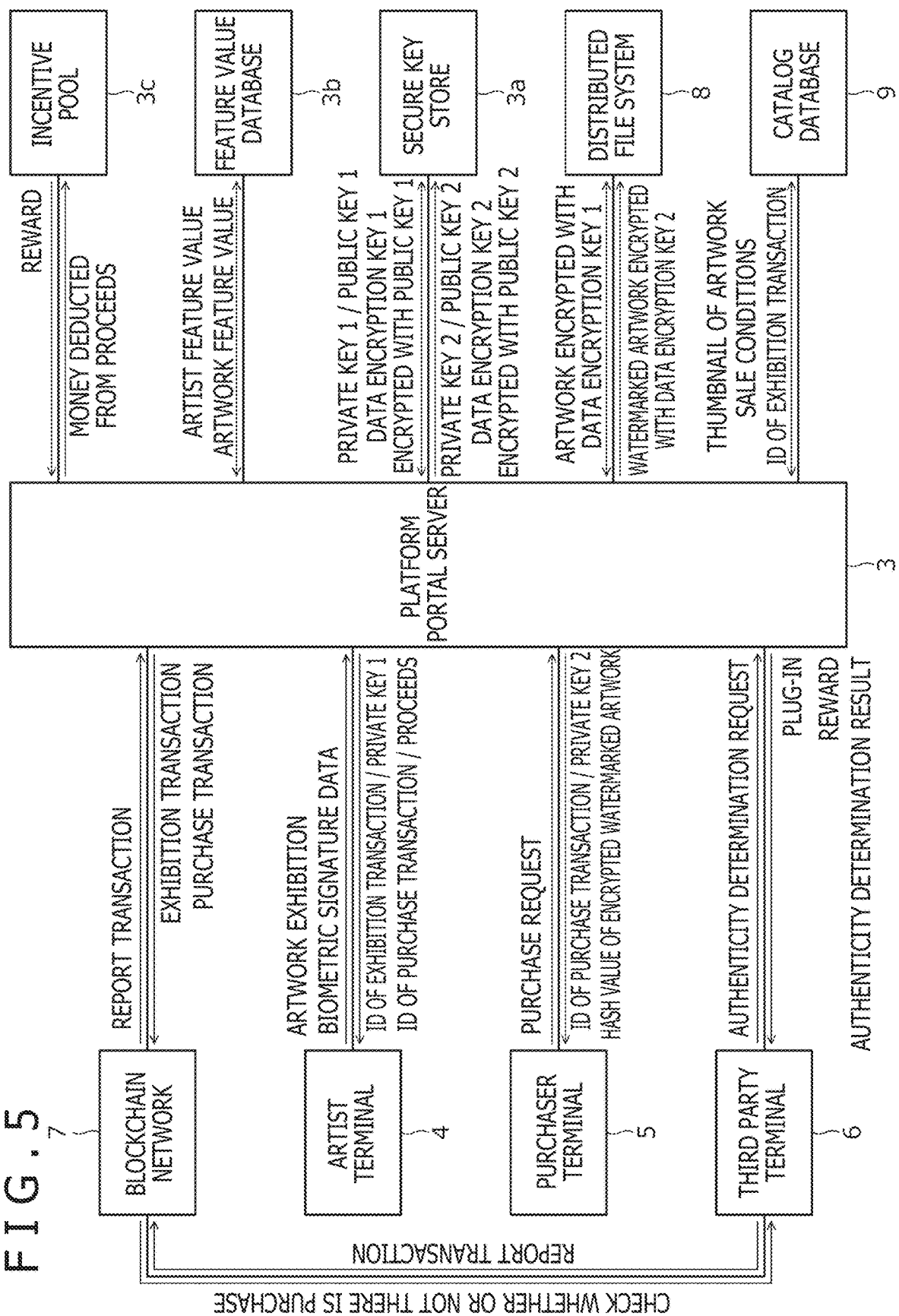
FIG. 5 is a diagram illustrating input and output of data to and from the platform portal server 3.

FIG. 5 is a diagram illustrating input and output of data to and from the platform portal server 3. The following description is focused on each of a stage of accepting the exhibition of the artwork, a stage of realizing the purchase of the artwork, a stage of monitoring the unauthorized use of the artwork, and a stage of determining the authenticity of the artwork.

First, in the stage of accepting the exhibition of the artwork, the platform portal server 3 accepts the exhibition of the artwork from the artist terminal 4. The exhibition includes a digital ink file which is the artwork itself, and includes sale conditions (such as whether the artwork is charged or free and the price in a case where the artwork is charged). Note that the price may be indicated in the virtual currency (such as Ether) supported by the blockchain network 7. The platform portal server 3 also accepts, from the artist terminal 4, input of the biometric signature data described above. The platform portal server 3 that has received the exhibition and the biometric signature data records a transaction indicating the exhibition (an exhibition transaction) in the blockchain network 7. Specifics of the exhibition transaction will be described later.

The platform portal server 3 that has accepted the exhibition of the artwork assigns identification information (hereinafter referred to as "image ID (identification)") in a predetermined format to the artwork and embeds the image ID into the artwork. The platform portal server 3 then uses the data encryption key 1 corresponding to a common key of common key cryptography to encrypt the artwork into which the image ID is embedded, and stores the artwork in the distributed file system 8. Note that the image ID can be any information in a predetermined format that allows for identification of the artwork distributed in the market. Specifically, the image ID may be a random character string or may be a hash value of the artwork. In addition, the platform portal server 3 generates a pair of a public key 1 and a private key 1 corresponding to a public key and a private key in public key cryptography and uses the public key 1 to encrypt the data encryption key 1. The platform portal server 3 then stores the pair of the public key 1 and the private key 1 and the encrypted data encryption key 1 in the secure key store 3*a*. Note that the reason the data encryption key 1 is used to encrypt the artwork instead of the public key 1 is that large-sized data like artwork cannot be encrypted with the public key in the public key cryptography.

The platform portal server 3 further registers, in the catalog database 9, a thumbnail of the exhibited artwork, sale conditions, and an ID (identification information) of the exhibition transaction recorded in the blockchain network 7 and returns, to the artist terminal 4, the ID of the exhibition transaction and the private key 1. The returned ID of the exhibition transaction is used by the artist to refer to the blockchain network 7 to check the details of the exhibition of the artist. In addition, the private key 1 is used by the artist to take out the artwork of the artist from the distributed file system 8.

In addition, the platform portal server 3 acquires one or more values indicating features of the artwork production of the artist from one or more pieces of stroke data included in the exhibited artwork and inputs the acquired values to a machine learning model to acquire the artist feature value. The platform portal server 3 then stores the acquired artist feature value described above in the feature value database 3*b* in association with information that specifies the artist. Details of the artist feature value and the machine learning model will be described later.

Similarly, the platform portal server 3 acquires a plurality of values indicating features of the artwork from one or more pieces of stroke data included in the exhibited artwork and stores the values as an artwork feature value in the feature value database 3*b*. Details of the artwork feature value will also be described later.

Next, in the stage of realizing the purchase of the exhibited artwork, the platform portal server 3 receives a purchase request from the purchaser terminal 5. The purchase request includes purchaser information indicating the purchaser (such as an account on the blockchain network 7 and a name), information indicating the artwork selected by the purchaser, and purchase price money (for example, information indicating any amount of virtual currency). The platform portal server 3 that has received the purchase request records, in the blockchain network 7, a transaction indicating the purchase (a purchase transaction). Specifics of the purchase transaction will be described later.

The platform portal server 3 that has received the purchase request takes out the private key 1 and the data encryption key 1 from the secure key store 3*a* and takes out the artwork from the distributed file system 8. The platform portal server 3 then uses the private key 1 to decrypt the data encryption key 1 and uses the decrypted data encryption key 1 to decrypt the artwork (the artwork provided with the image ID).

The platform portal server 3 further embeds a watermark into the decrypted artwork to generate watermarked artwork, uses the data encryption key 2 to encrypt the watermarked artwork, and stores the watermarked artwork in the distributed file system 8. The watermark is generated based on an ID (identification information) of the purchase transaction, as will be described in detail later.

The platform portal server 3 also generates a pair of a public key 2 and a private key 2 corresponding to a public key and a private key in public key cryptography and uses the public key 2 to encrypt the data encryption key 2. The platform portal server 3 then stores the pair of the public key 2 and the private key 2 and the encrypted data encryption key 2 in the secure key store 3*a*. Note that the reason the data encryption key 2 is used to encrypt the watermarked artwork instead of the public key 2 is that the size of the watermarked artwork is large, as in the case of the exhibition.

Subsequently, the platform portal server 3 executes a process of returning the ID of the purchase transaction, the private key 2, and the hash value of the encrypted watermarked artwork to the purchaser terminal 5, and executes a process of transmitting the ID of the purchase transaction and the proceeds to the artist terminal 4. The ID of the purchase transaction returned to each terminal is used by the purchaser and the artist to refer to the blockchain network 7 and check the details of the purchase. In addition, the private key 2 and the hash value of the encrypted watermarked artwork are used by the purchaser to take out the purchased artwork from the distributed file system 8 and decrypt the purchased artwork.

In addition, the platform portal server 3 executes a process of deducting a part of the proceeds (for example, ten percent) in transferring the proceeds to the artist terminal 4 and storing the part in the incentive pool 3*c* in association with the image ID. The money (for example, virtual currency) stored in the incentive pool 3*c* in this way is used to pay to the user of the third party terminal 6 a reward for discovering unauthorized use. Note that, in a case where compensation for damages is obtained through a copyright infringement lawsuit or the like after discovery of unauthorized use, all or part of the compensation may also be stored in the incentive pool 3*c* in a format of virtual currency.

Next, in the stage of monitoring unauthorized use of the artwork, the platform portal server 3 first distributes a plug-in (add-on) to the browser software to the third party terminal 6. The plug-in operates on the browser software and has a function of monitoring a website loaded by a user. In addition, information necessary for accessing the blockchain network 7 (a contract account to be described later) is written in advance in the plug-in.

Specifically, the plug-in performs the monitoring by detecting the artwork managed by the artwork trade and management system 1, generating a report indicating discovery of unauthorized use of the artwork in a case where a purchase transaction corresponding to the detected artwork exists in the blockchain network 7, and recording a report transaction indicating the generated report in the blockchain network 7. Further details of the process will be described later.

Once a new report transaction is recorded in the blockchain network 7, the platform portal server 3 acquires the money stored in the incentive pool 3c in association with the image ID of the artwork corresponding to the report transaction and transmits the money as a reward to the third party terminal 6 that has recorded the report transaction. The money transmitted in this way functions as an incentive for the user of the third party terminal 6 to continue operating the above-described plug-in.

Figure 6:
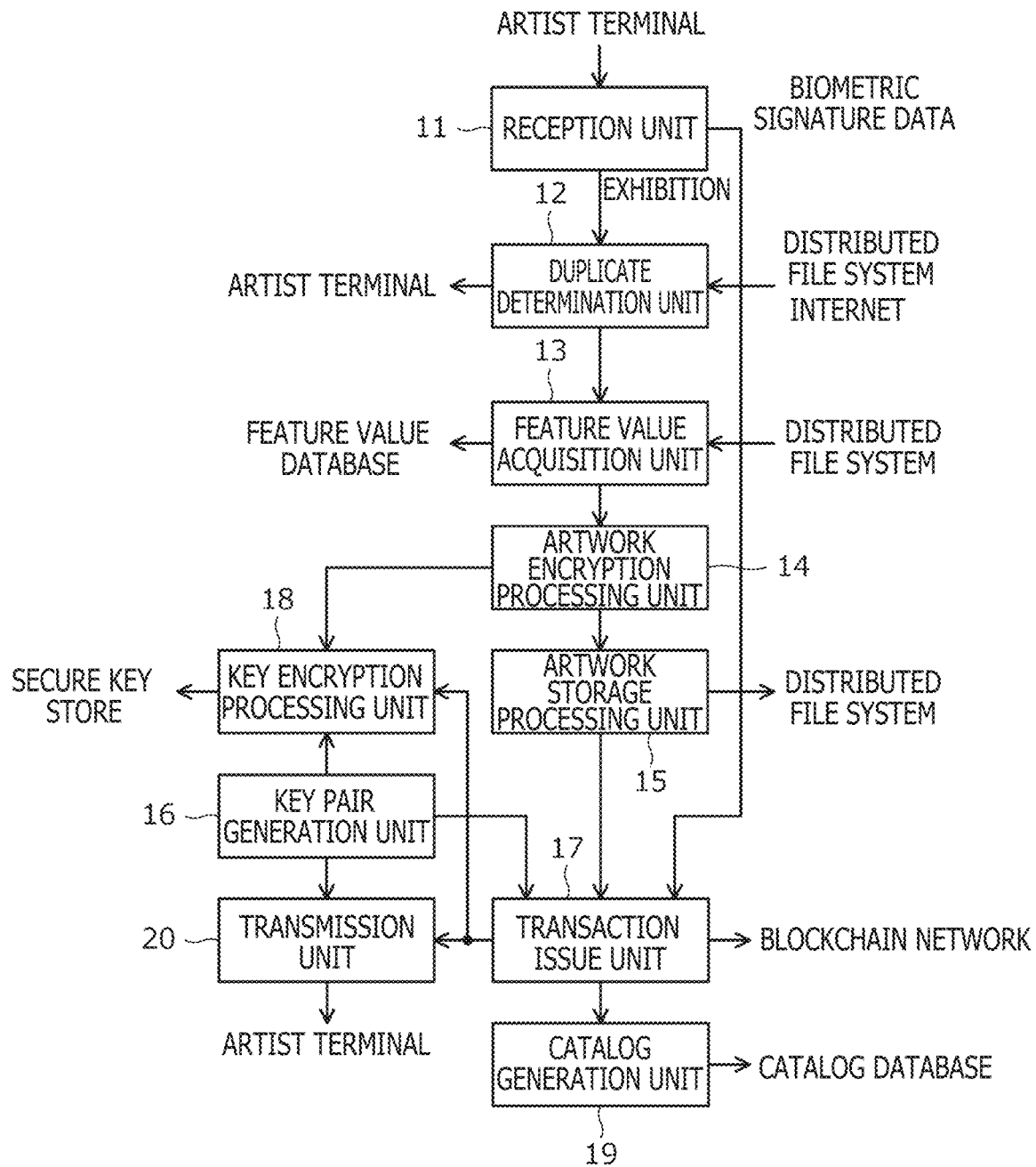
FIG. 6 is a functional block diagram of the platform portal server 3 regarding exhibition of artwork.
Figure 7:
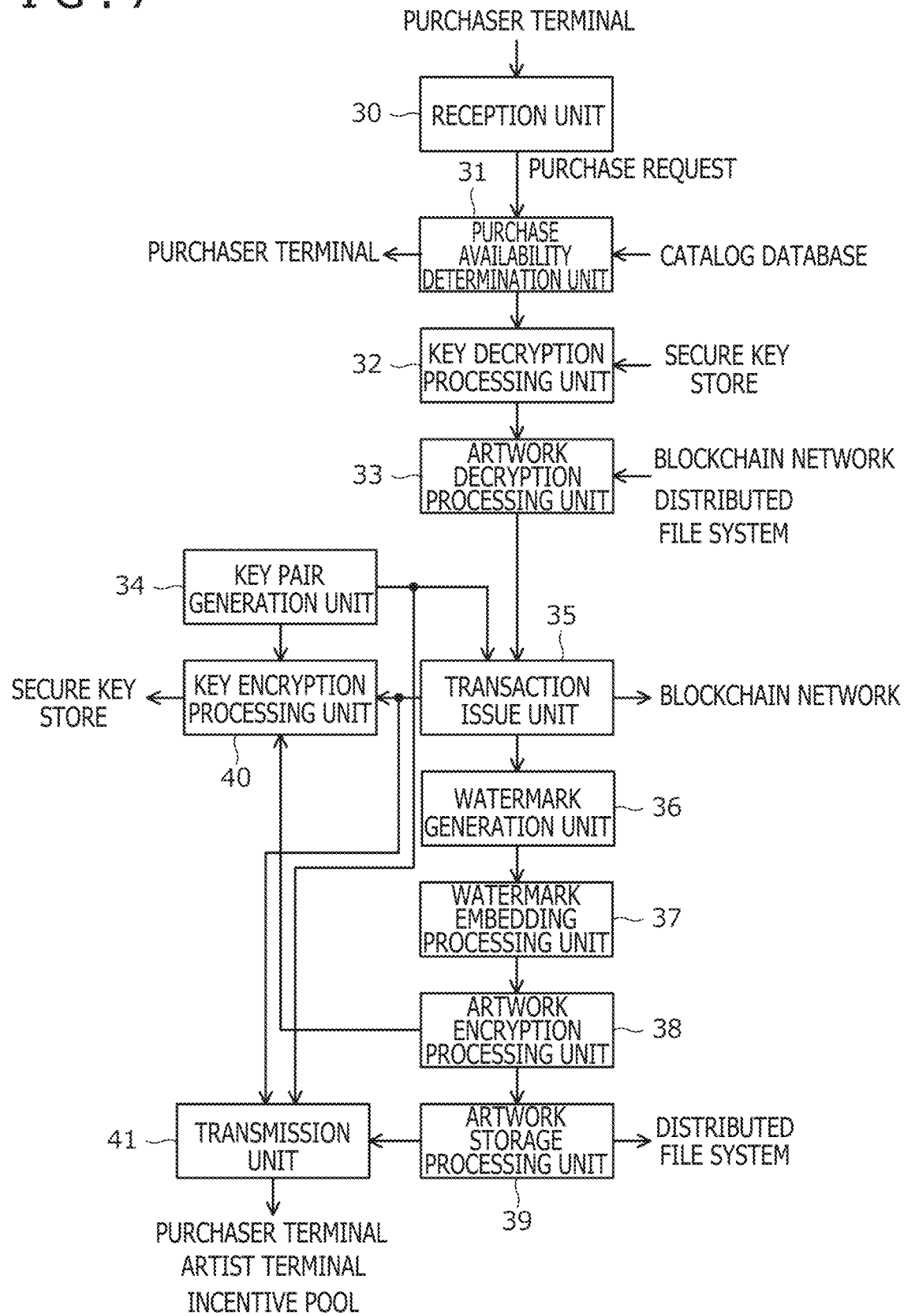
FIG. 7 is a functional block diagram of the platform portal server 3 regarding sale of the artwork.
Figure 8A:
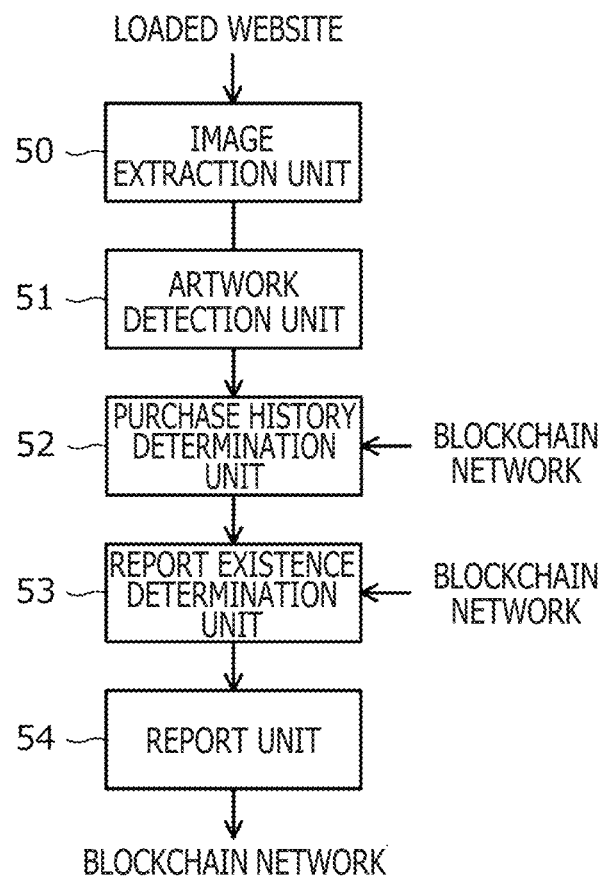
FIG. 8A is a functional block diagram of a plug-in installed on a third party terminal 6.
Figure 8B:
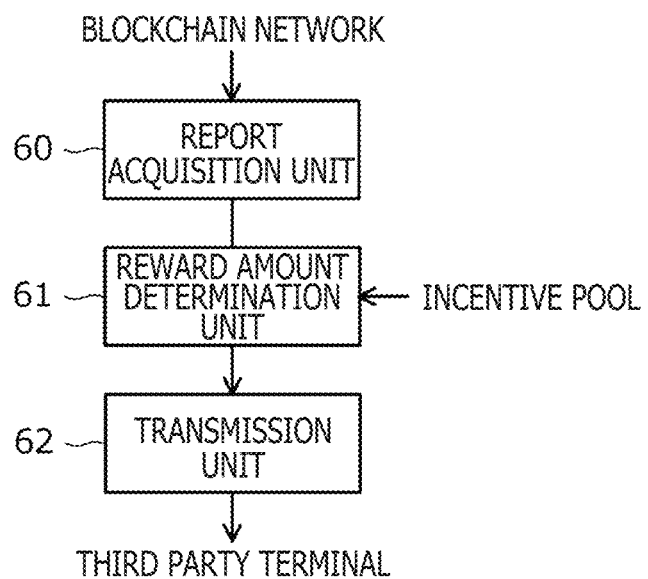
FIG. 8B is a functional block diagram of the platform portal server 3 regarding payment of a reward to the third party terminal 6.
Figure 9:
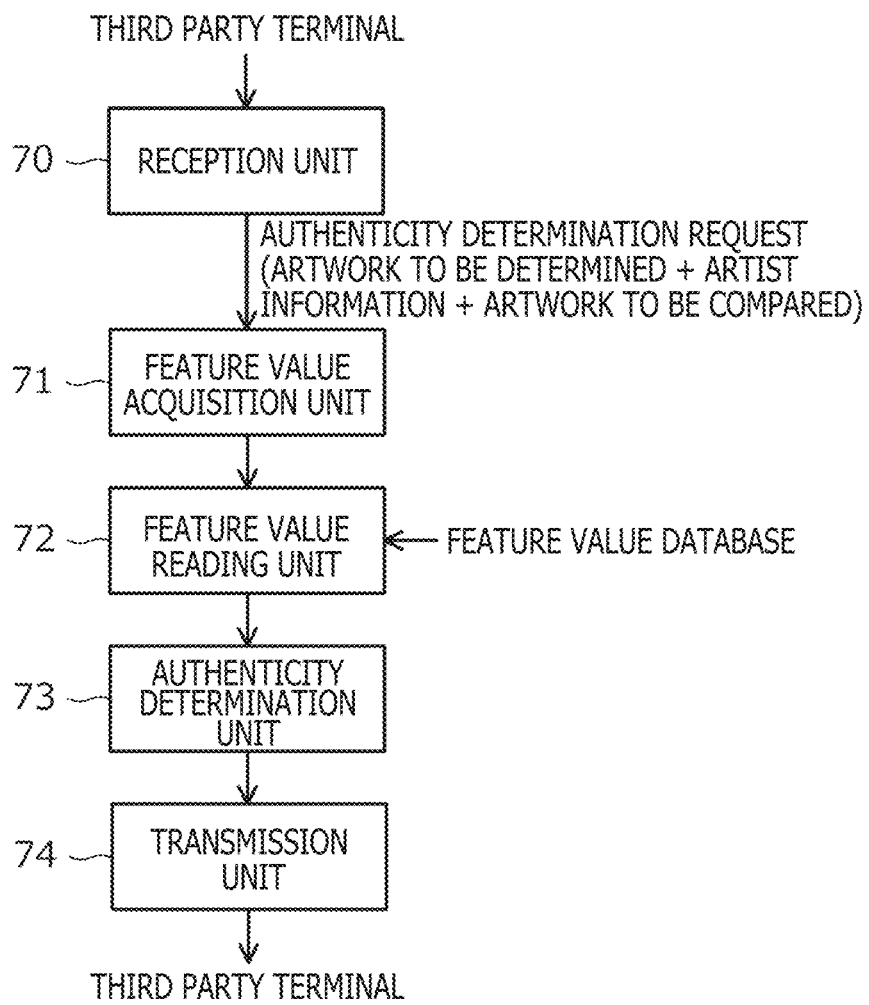
FIG. 9 is a functional block diagram of the platform portal server 3 regarding authenticity determination of the artwork.

FIGS. 6 to 9 are functional block diagrams of the platform portal server 3 and the plug-in installed on the third party terminal 6. FIG. 6 illustrates functional blocks of the platform portal server 3 regarding exhibition of the artwork, FIG. 7 illustrates functional blocks of the platform portal server 3 regarding sale of the artwork, FIG. 8A illustrates functional blocks of the plug-in installed on the third party terminal 6, FIG. 8B illustrates functional blocks of the platform portal server 3 regarding payment of a reward to the third party terminal 6, and FIG. 9 illustrates functional blocks of the platform portal server 3 regarding authenticity determination of the artwork. Hereinafter, the functional blocks of the platform portal server 3 will be described in detail with reference to these drawings.

First, as illustrated in FIG. 6, the platform portal server 3 includes functional blocks regarding exhibition of the artwork including a reception unit 11, a duplicate determination unit 12, a feature value acquisition unit 13, an artwork encryption processing unit 14, an artwork storage processing unit 15, a key pair generation unit 16, a transaction issue unit 17, a key encryption processing unit 18, a catalog generation unit 19, and a transmission unit 20.

The reception unit 11 receives the exhibition of the artwork from the artist terminal 4. The exhibition includes the artwork itself and the information indicating sale conditions, as described above.

The duplicate determination unit 12 determines whether or not the exhibited artwork is a duplicate of other artwork (that is, whether or not the exhibited artwork is unique). The determination may be made, for example, by comparing the exhibited artwork against the artwork previously stored by the platform portal server 3 in the distributed file system 8, by comparing the exhibited artwork against images obtained by search on the Internet, or by performing both. As a result of the comparison, in a case where other artwork as a duplicate of the exhibited artwork is not discovered, the duplicate determination unit 12 determines that the exhibited artwork is not a duplicate and causes the reception unit 11 to further receive the biometric signature data from the artist terminal 4. On the other hand, in a case where other artwork as a duplicate of the exhibited artwork is discovered, the duplicate determination unit 12 determines that the exhibited artwork is a duplicate and returns an exhibition prohibition to the artist terminal 4.

In addition, the duplicate determination unit 12 executes a process of assigning unique identification information (hereinafter referred to as "image ID") to the artwork determined not to be a duplicate and embedding the image ID into the artwork. The process may be executed by, for example, adding the image ID as metadata to the artwork, by diagonally arranging the image ID in a visible state to the surface of the artwork, or by generating a watermark that indicates the image ID in a process similar to a process of a watermark generation unit 36 described later and embedding the generated watermark into the artwork in a process similar to a process of a watermark embedding processing unit 37 described later.

The feature value acquisition unit 13 executes a process of acquiring the above-described artist feature value and artwork feature value on the basis of the artwork determined not to be a duplicate by the duplicate determination unit 12 and storing the artist feature value and the artwork feature value in the feature value database 3b. Hereinafter, the process will be described in detail with reference to FIGS. 10 and 11.

Figure 10A:
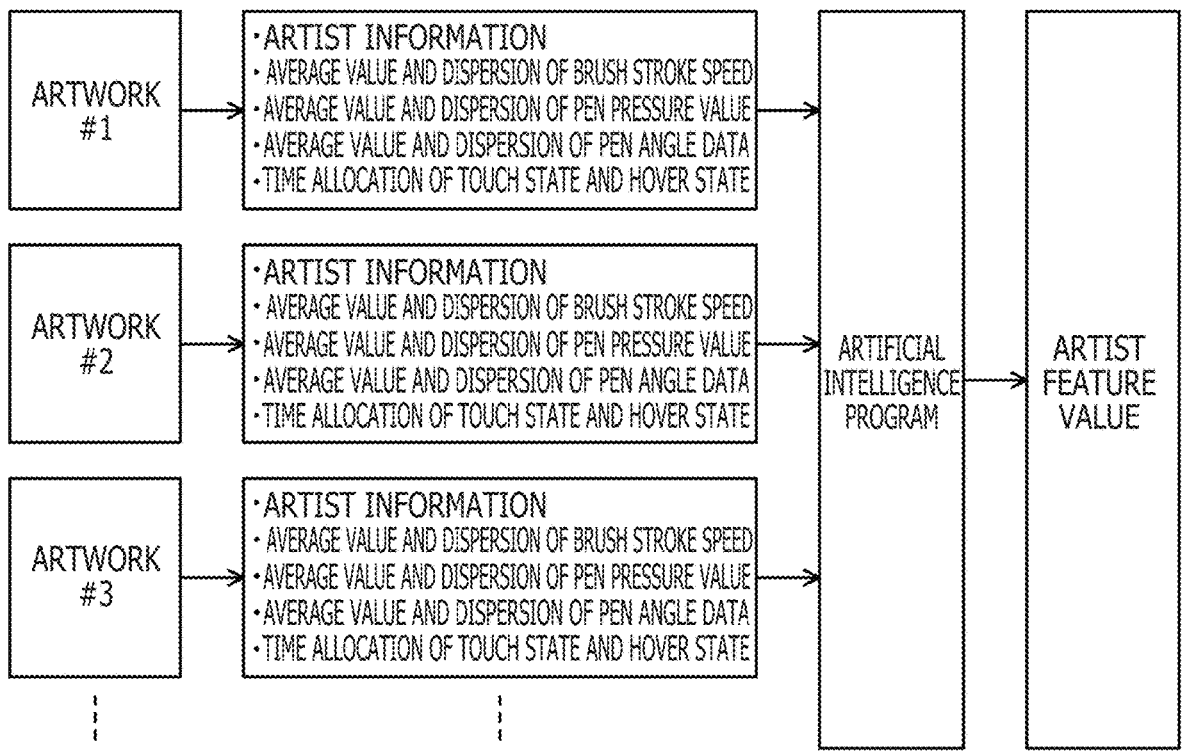
FIG. 10A is a diagram describing an artist feature value indicating features of artwork production of an artist.
Figure 10B:
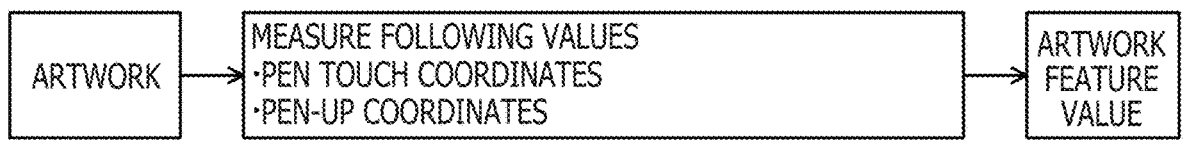
FIG. 10B is a diagram describing an artwork feature value including a plurality of values indicating features of the artwork.

FIG. 10A is a diagram describing the artist feature value indicating features of the artwork production of the artist (habits), and FIG. 10B is a diagram describing the artwork feature value including a plurality of values indicating the features of the artwork.

First, as illustrated in FIG. 10A, the platform portal server 3 acquires one or more values indicating features of the artwork production of the artist from one or more pieces of stroke data included in the artwork, every time there is artwork determined not to be a duplicate by the duplicate determination unit 12. The platform portal server 3 inputs the one or more values to the above-described artificial intelligence program along with the artist information indicating the artist of the artwork. The artificial intelligence program uses deep learning to learn the data input in this way and constructs a machine learning model. The machine learning model constructed in this way can output the artist feature value in response to new input of the above-described one or more values.

The one or more values input to the artificial intelligence program typically include an average value and a dispersion of brush stroke speed, an average value and a dispersion of pen pressure value, an average value and a dispersion of pen angle data, and time allocation of the touch state and the hover state, as illustrated in FIG. 10A. However, it is obvious that only some of these values or other values may be used.

The platform portal server 3 acquires the above-described one or more values from one or more pieces of stroke data included in the artwork determined not to be a duplicate by the duplicate determination unit 12 and inputs the one or more values to the machine learning model constructed by the artificial intelligence program. As a result, the artist feature value is output from the machine learning model. The platform portal server 3 stores the artist feature value acquired in this way in the feature value database 3b in association with the corresponding artist information. In a case where the artist feature value regarding the same artist is already stored in the feature value database 3b, the stored artist feature value is updated by the newly acquired artist feature value.

Next, with reference to FIG. 10B, the platform portal server 3 acquires the artwork feature value including a plurality of values indicating the features of the artwork from one or more pieces of stroke data included in the artwork determined not to be a duplicate by the duplicate determination unit 12. The plurality of values include a series of pen touch coordinates indicating the positions of the pen when a pen touch is performed and a series of pen-up coordinates indicating the positions of the pen when a pen-up is performed. The platform portal server 3 stores the artwork feature value acquired in this way in the feature value database 3b in association with the corresponding artwork.

Data illustrated in the following Table 1 is an example of a plurality of values included in the artwork feature value. In the data, "d" at the beginning of each line represents a pen touch (pen-down), and "u" represents a pen-up. In addition, two coordinates after "d" or "u" represent the X-coordinate and the Y-coordinate, respectively.

TABLE 1

| | | |
|---|---|---|
| d | 20, | 43 |
| u | 58, | 93 |
| d | 209, | 4 |
| u | 34, | 349 |
| d | 84, | 578 |
| u | 95, | 600 |

Figure 11:
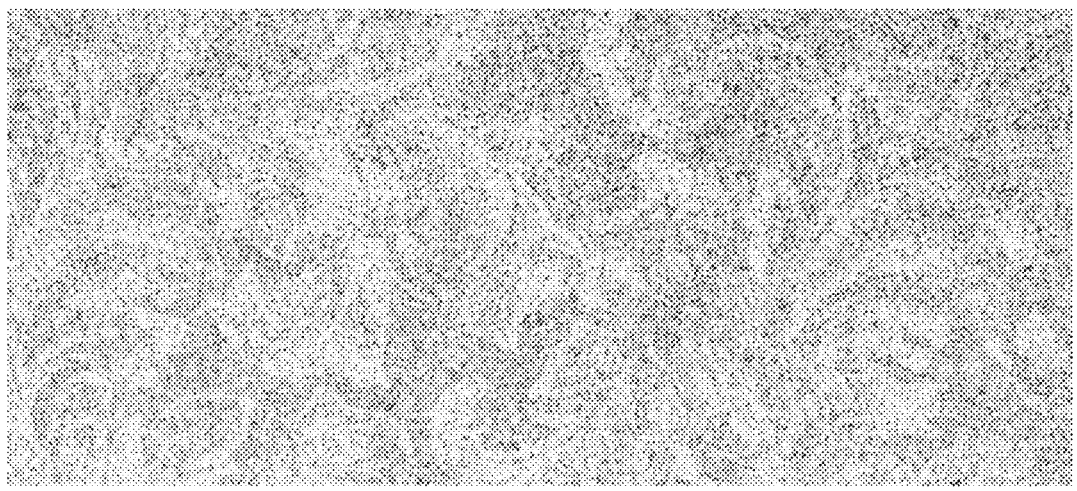
FIG. 11 is a figure illustrating a specific example of the artwork feature value.

FIG. 11 is a figure illustrating an example of a mapped artwork feature value. In FIG. 11, the number of occurrences of a pen touch and a pen-up is indicated by the density of gray scale in each coordinate. In this way, mapping of the artwork feature value results in a noise image indicating features of the artwork. The noise image itself may be used as the artwork feature value.

FIG. 6 will be further described. The artwork encryption processing unit 14 encrypts the artwork in a case where the duplicate determination unit 12 determines that the artwork is not a duplicate. Specifically, the artwork encryption processing unit 14 first generates the data encryption key 1 corresponding to the common key in common key cryptography. The artwork encryption processing unit 14 then uses the generated data encryption key 1 to encrypt the artwork.

The artwork storage processing unit 15 executes a process of storing the artwork encrypted by the artwork encryption processing unit 14 in the distributed file system 8 in association with the image ID assigned by the duplicate determination unit 12, and acquires a hash value of the artwork.

The key pair generation unit 16 generates a pair of a public key 1 and a private key 1 corresponding to the public key and the private key in public key cryptography.

The transaction issue unit 17 generates an exhibition transaction including the image ID assigned by the duplicate determination unit 12, the hash value of the encrypted artwork acquired by the artwork storage processing unit 15, the biometric signature data received by the reception unit 11, and the public key 1 generated by the key pair generation unit 16, and issues the exhibition transaction to the contract account (to be described later) of the blockchain network 7. Subsequently, any one of the miners connected to the blockchain network 7 completes recording of the exhibition transaction in the blockchain.

The key encryption processing unit 18 uses the public key 1 generated by the key pair generation unit 16 to encrypt the data encryption key 1, and stores the data encryption key 1 in the secure key store 3a along with the pair of the public key 1 and the private key 1 in association with the ID of the exhibition transaction issued by the transaction issue unit 17.

The catalog generation unit 19 generates a thumbnail of the exhibited artwork and registers the thumbnail in the catalog database 9 along with the sale conditions and the ID of the exhibition transaction. The artwork exhibited in this way is registered in the catalog database 9, and the purchaser can refer to the catalog database 9 to select the artwork to be purchased.

The transmission unit 20 returns the ID of the exhibition transaction issued by the transaction issue unit 17 and the private key 1 generated by the key pair generation unit 16 to the artist terminal 4. As a result, the artist can check the exhibition transaction on the blockchain network 7 and can acquire and decrypt the encrypted artwork stored in the distributed file system 8, to check the original artwork.

The check of the original artwork by the artist will be described in more detail. The artist uses the artist terminal 4 to transmit the ID of the exhibition transaction and the private key 1 to the platform portal server 3. The platform portal server 3 refers to the blockchain network 7 on the basis of the ID of the exhibition transaction received from the artist terminal 4, to acquire the hash value of the encrypted artwork. The platform portal server 3 then uses the acquired hash value to access the distributed file system 8 and reads the encrypted artwork. The platform portal server 3 also reads the encrypted data encryption key 1 from the secure key store 3a on the basis of the ID of the exhibition transaction received from the artist terminal 4 and uses the private key 1 received from the artist terminal 4 to decrypt the encrypted data encryption key 1. Lastly, the platform portal server 3 uses the decrypted data encryption key 1 to decrypt the encrypted artwork to acquire the artwork and returns the artwork to the artist terminal 4. In this way, the artist can check the artwork.

Next, with reference to FIG. 7, the platform portal server 3 includes functional blocks regarding sale of the artwork including a reception unit 30, a purchase availability determination unit 31, a key decryption processing unit 32, an artwork decryption processing unit 33, a key pair generation unit 34, a transaction issue unit 35, the watermark generation unit 36, the watermark embedding processing unit 37, an artwork encryption processing unit 38, an artwork storage processing unit 39, a key encryption processing unit 40, and a transmission unit 41.

The reception unit 30 receives the purchase request indicating an intent to purchase the artwork from the purchaser terminal 5. The purchase request includes the purchaser information, the information indicating the artwork selected by the purchaser, and the purchase price money as described above.

The purchase availability determination unit 31 determines whether or not the purchase request can be fulfilled. Specifically, the purchase availability determination unit 31 first reads the sale conditions of the corresponding artwork and the ID of the exhibition transaction from the catalog database 9. The purchase availability determination unit 31 then compares the read sale conditions and the details of the purchase request and determines whether or not the purchase request can be fulfilled based on the result of the comparison. For example, in a case where a sale condition stipulates that the price of the artwork is 1 Ether, the purchase availability determination unit 31 determines that the purchase request is fulfilled if the purchase request includes 1 Ether. On the other hand, the purchase availability determination unit 31 determines that the purchase request is not fulfilled if the purchase request does not include 1 Ether. In the latter case, the purchase availability determination unit 31 returns a purchase prohibition to the purchaser terminal 5.

The key decryption processing unit 32 reads the private key 1 and the encrypted data encryption key 1 from the secure key store 3a on the basis of the ID of the exhibition transaction. The key decryption processing unit 32 then uses the read private key 1 to decrypt the read encrypted data encryption key 1.

The artwork decryption processing unit 33 refers to the blockchain network 7 on the basis of the ID of the exhibition transaction to acquire the image ID of the artwork or the hash value of the encrypted artwork. The artwork decryption processing unit 33 then reads the encrypted artwork from the distributed file system 8 on the basis of the acquired image ID or the hash value and uses the data encryption key 1 decrypted by the key decryption processing unit 32 to decrypt the encrypted artwork.

The key pair generation unit 34 generates a pair of a public key 2 and a private key 2 corresponding to the public key and the private key in public key cryptography.

The transaction issue unit 35 generates a purchase transaction including the purchaser information included in the purchase request, the ID of the exhibition transaction read by the purchase availability determination unit 31 from the catalog database 9, the image ID of the artwork, the amount of money indicating the purchase amount of the artwork, and the public key 2 generated by the key pair generation unit 34, and issues the purchase transaction to the contract account (described later) of the blockchain network 7. Subsequently, any one of the miners connected to the blockchain network 7 completes recording of the purchase transaction in the blockchain.

The watermark generation unit 36 generates a watermark on the basis of the ID of the purchase transaction issued by the transaction issue unit 35. The watermark generated in this way is, for example, a QR (Quick Response) code (registered trademark) indicating an ID of the purchase transaction. The watermark embedding processing unit 37 executes a process of embedding the watermark into the artwork decrypted by the artwork decryption processing unit 33, to thereby generate watermarked artwork. Details of the process will be described in detail later with reference to FIG. 16.

The artwork encryption processing unit 38 generates the data encryption key 2 corresponding to the common key in common key cryptography and uses the generated data encryption key 2 to encrypt the watermarked artwork. The artwork storage processing unit 39 executes a process of storing, in the distributed file system 8, the watermarked artwork encrypted by the artwork encryption processing unit 38, and acquires a hash value of the watermarked artwork.

The key encryption processing unit 40 uses the public key 2 generated by the key pair generation unit 34 to encrypt the data encryption key 2, and stores the data encryption key 2 in the secure key store 3a in association with the ID of the purchase transaction issued by the transaction issue unit 35.

The transmission unit 41 returns the ID of the purchase transaction, the hash value acquired by the artwork storage processing unit 39, and the private key 2 generated by the key pair generation unit 34 to the purchaser terminal 5, and transmits the ID of the purchase transaction and a part of the proceeds (for example, ninety percent) to the artist terminal 4. The rest of the proceeds (for example, ten percent) is stored in the incentive pool 3c. As a result, the purchaser and the artist can check the purchase transaction on the blockchain network 7. In addition, the purchaser can acquire and decrypt the encrypted watermarked artwork stored in the distributed file system 8, to acquire the purchased artwork in the watermarked state. Further, a reward for discovering unauthorized use of the artwork can be provided to the third party terminal 6.

Acquisition of the artwork by the purchaser will be described in more detail. The purchaser uses the purchaser terminal 5 to transmit the hash value of the encrypted watermarked artwork, the ID of the purchase transaction, and the private key 2 to the platform portal server 3. The platform portal server 3 uses the hash value received from the purchaser terminal 5 to access the distributed file system 8, and reads the encrypted watermarked artwork. The platform portal server 3 also reads the encrypted data encryption key 2 from the secure key store 3a on the basis of the ID of the purchase transaction received from the purchaser terminal 5, and uses the private key 2 received from the purchaser terminal 5 to decrypt the encrypted data encryption key 2. Lastly, the platform portal server 3 uses the decrypted data encryption key 2 to decrypt the encrypted watermarked artwork and acquire the watermarked artwork and returns the watermarked artwork to the purchaser terminal 5. In this way, the purchaser can acquire the watermarked artwork.

Next, with reference to FIG. 8A, the third party terminal 6 includes functional blocks executed by the plug-in installed on the browser software including an image extraction unit 50, an artwork detection unit 51, a purchase history determination unit 52, a report existence determination unit 53, and a report unit 54.

The image extraction unit 50 extracts an image from a website loaded by the browser software. Specifically, the image extraction unit 50 scans a source code to acquire a path of an image file and uses the path to download the image file. The image file is, for example, a jpg file, a png file, or a gif file.

The artwork detection unit 51 attempts to extract the image ID from the image extracted by the image extraction unit 50, to detect artwork managed by the artwork trade and management system 1. That is, since the image ID should be embedded in the process described above in the image managed by the artwork trade and management system 1, the image is not an image managed by the artwork trade and management system 1 if the image ID cannot be extracted. Conversely, the image is an image managed by the artwork trade and management system 1 if the image ID can be extracted. Therefore, the artwork detection unit 51 detects, as artwork, the image from which the image ID can be extracted, and the artwork detection unit 51 supplies the artwork to the purchase history determination unit 52 along with the extracted image ID.

The purchase history determination unit 52 determines whether or not the purchase transaction corresponding to the artwork detected by the artwork detection unit 51 exists in the blockchain network 7. Specifically, the determination is made by determining whether or not there is a purchase transaction including the image ID extracted by the artwork detection unit 51. If the artwork does not have a corresponding purchase transaction in the blockchain network 7, then the artwork has not been purchased and, thus, the artwork should not be used in the website. The fact that the artwork is used in the website indicates that the use of the artwork is unauthorized. Therefore, the purchase history determination unit 52 determines to set, as a target of reporting, the artwork which is determined to not have a corresponding purchase transaction in the blockchain network 7, and reports the artwork together with the image ID to the report existence determination unit 53.

The report existence determination unit 53 determines whether or not a report transaction including the image ID notified from the purchase history determination unit 52 exists in the blockchain network 7. The existence of such a report transaction in the blockchain network 7 indicates that another third party terminal 6 has already discovered and reported its unauthorized use. Therefore, the report existence determination unit 53 ends the process without newly reporting the unauthorized use. On the other hand, if such a report transaction does not exist in the blockchain network 7, the report existence determination unit 53 outputs the image ID to the report unit 54.

The report unit 54 generates a report indicating discovery of an unauthorized use of the artwork regarding the image ID input from the report existence determination unit 53 and issues a report transaction indicating the generated report to the blockchain network 7. Subsequently, any one of the miners connected to the blockchain network 7 completes recording of the report transaction in the blockchain. The report transaction includes the image ID and the information indicating the third party terminal 6. The information indicating the third party terminal 6 indicates a recipient of payment when the platform portal server 3 later pays a reward for the report.

Next, with reference to FIG. 8B, the platform portal server 3 includes functional blocks regarding payment of the reward to the third party terminal 6 including a report acquisition unit 60, a reward amount determination unit 61, and a transmission unit 62.

The report acquisition unit 60 acquires the report transaction newly issued from the blockchain network 7. The report acquisition unit 60 can periodically check the blockchain network 7 to perform the acquisition.

The reward amount determination unit 61 determines a reward amount for the report transaction acquired by the report acquisition unit 60. In a typical example, the reward amount determination unit 61 determines, as the reward amount, an amount of money equal to the price of the artwork minus the amount of money paid to the artist. For example, if the price of the artwork is 1 Ether and the amount of money paid to the artist is ninety percent, that is, 0.9 Ether, the reward amount determination unit 61 determines that 0.1 Ether is the reward amount.

The transmission unit 62 transmits, to the third party terminal 6, virtual currency corresponding to the reward amount determined by the reward amount determination unit 61. This completes payment of the reward.

Next, with reference to FIG. 9, the platform portal server 3 includes functional blocks regarding authenticity determination of the artwork including a reception unit 70, a feature value acquisition unit 71, a feature value reading unit 72, an authenticity determination unit 73, and a transmission unit 74.

The reception unit 70 receives an authentication determination request from the third party terminal 6. The authenticity determination request includes artwork discovered by the third party terminal 6 in a website or the like of a third party (hereinafter referred to as "artwork to be determined"), information described in the website as the artist of the artwork to be determined (artist information), and information that specifies one piece of artwork of plural pieces of artwork managed by the artwork trade and management system 1 (hereinafter referred to as "artwork to be compared"). Note that the information that specifies the artwork to be compared may be any information which can specify one of the plural pieces of artwork managed by the artwork trade and management system 1, and the information is, for example, the image ID. The artwork to be determined may be artwork not including the image ID, unlike the artwork detected by the artwork detection unit 51 of FIG. 8A.

The feature value acquisition unit 71 acquires the above-described artist feature value and artwork feature value on the basis of the artwork to be determined. Specifically, the feature value acquisition unit 71 acquires the above-described one or more values (for example, an average value and a dispersion of brush stroke speed, an average value and a dispersion of a pen pressure value, an average value and a dispersion of pen angle data, and time allocation of the touch state and the hover state) from one or more pieces of stroke data included in the artwork to be determined and inputs the one or more values to the machine learning model. As a result, the artist feature value is output from the machine learning model. In addition, the feature value acquisition unit 71 acquires the plurality of values (for example, a series of pen touch coordinates indicating the positions of the pen when a pen touch is performed and a series of pen-up coordinates indicating the positions of the pen when a pen-up is performed) indicating features of the artwork to be determined, from one or more pieces of stroke data included in the artwork to be determined, to thereby acquire the artwork feature value.

The feature value reading unit 72 reads, from the feature value database 3b, the artist feature value stored in association with the artist indicated in the artist information and the artwork feature value stored in association with the artwork to be compared.

The authenticity determination unit 73 compares the artist feature value and the artwork feature value acquired by the feature value acquisition unit 71 with the artist feature value and the artwork feature value read by the feature value reading unit 72 and determines authenticity of the artwork to be determined, on the basis of the result of the comparison. Specifically, the authenticity determination unit 73 executes predetermined computation to calculate the likelihood of the artist feature value and the likelihood of the artwork feature value. The authenticity determination unit 73 determines that the artwork to be determined is real in a case where both of the two calculated likelihoods are equal to or greater than a predetermined value and determines that the artwork to be determined is fake in a case where either one of the two calculated likelihoods is smaller than the predetermined value.

The transmission unit 74 returns the result of the determination by the authenticity determination unit 73 to the third party terminal 6. As a result, the user of the third party terminal 6 can recognize whether the artwork to be determined is real or fake.

Figure 16:
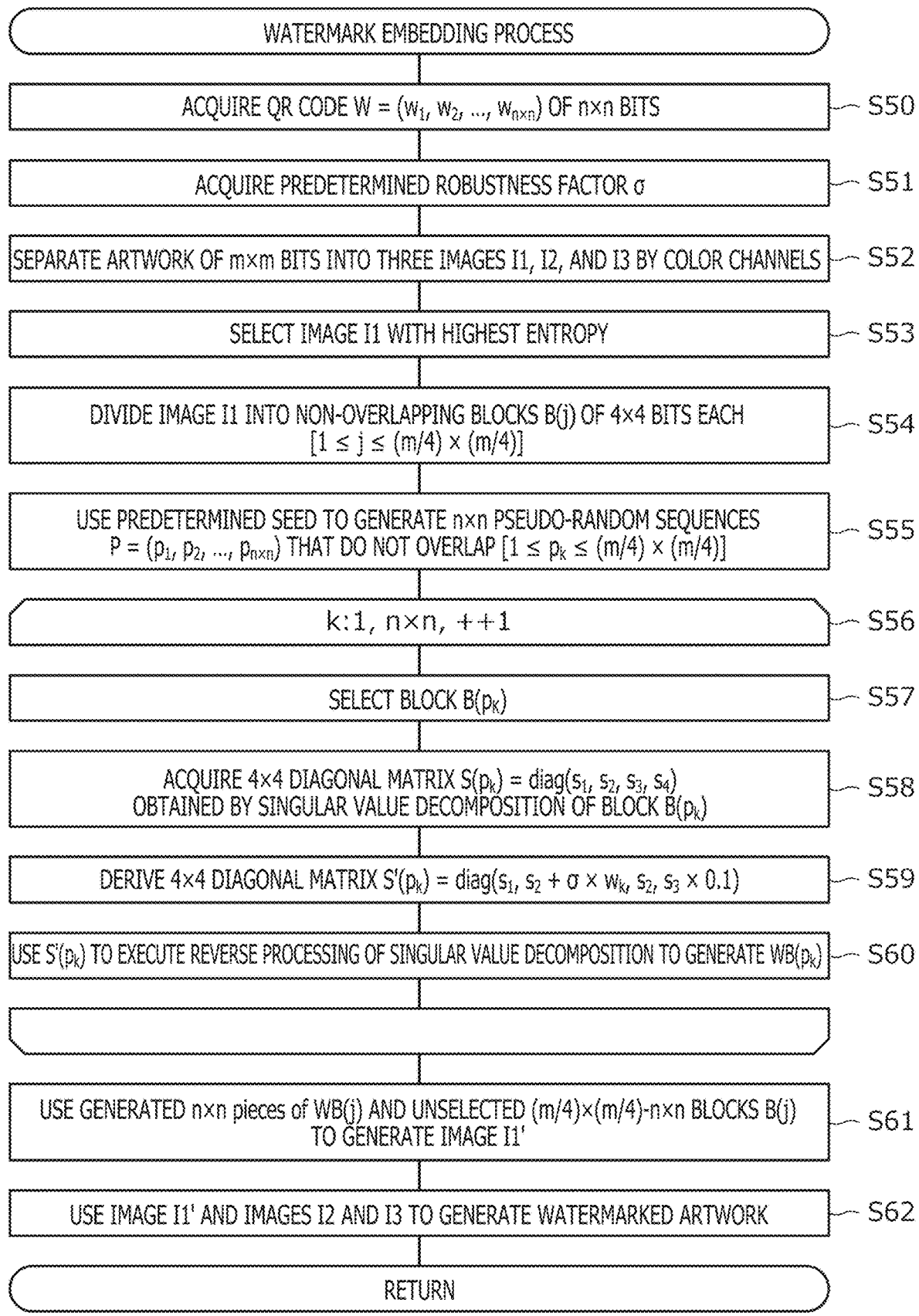
FIG. 16 is a diagram illustrating details of a watermark embedding process executed in step S41 of FIG. 14.
Figure 17:
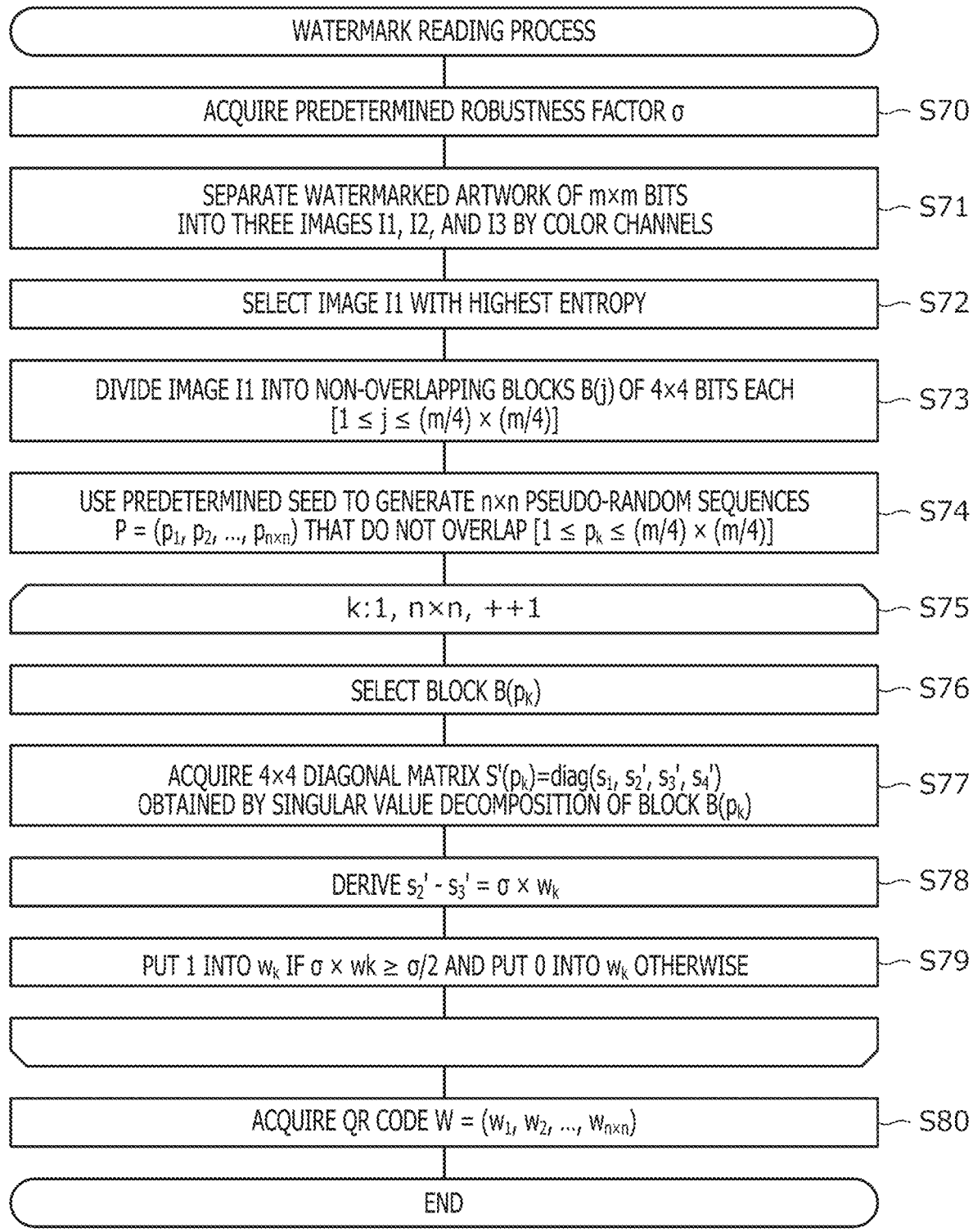
FIG. 17 is a process flow chart illustrating a process for reading a watermark from watermarked artwork generated in the watermark embedding process illustrated in FIG. 16.
Figure 18:
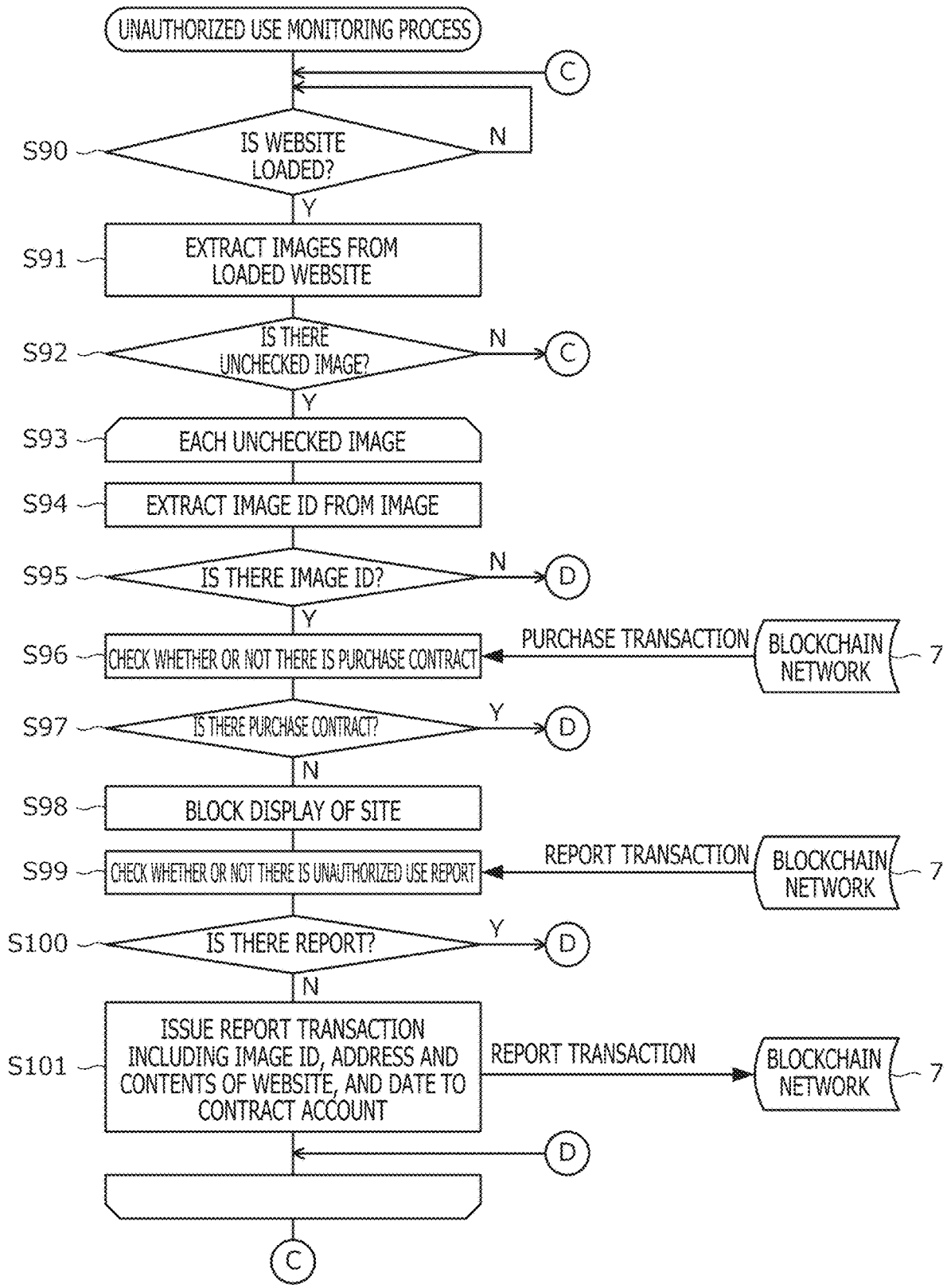
FIG. 18 is a process flow chart illustrating an unauthorized use monitoring process executed by the plug-in installed on browser software of the third party terminal 6.

FIGS. 12 to 17, 19, and 20 are process flow charts illustrating processes executed by the platform portal server 3. In addition, FIG. 18 is a process flow chart illustrating a process executed by the third party terminal 6. Hereinafter, further details of the processes executed by the platform portal server 3 will be described with reference to the drawings.

Figure 12:
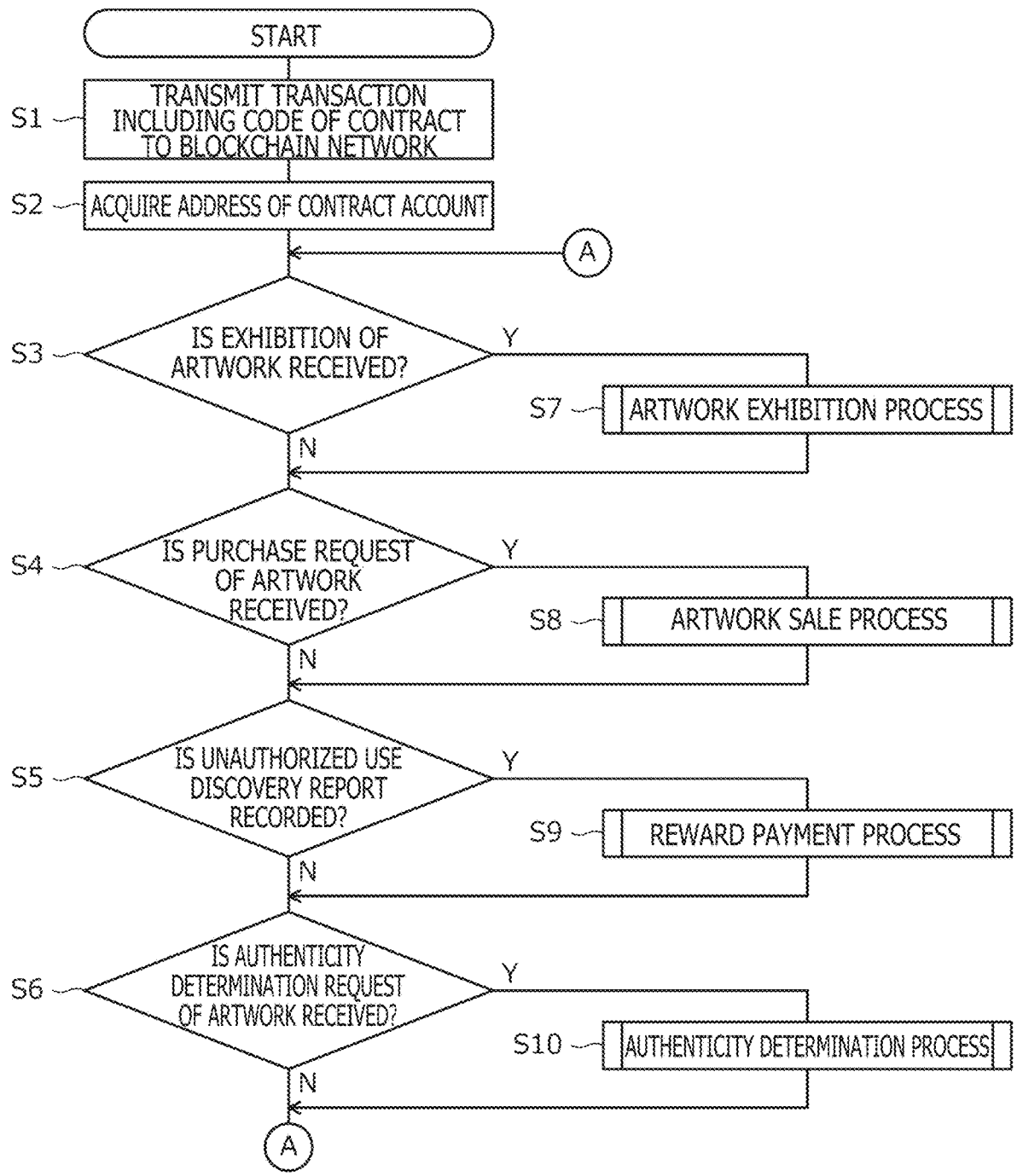
FIG. 12 is a process flow chart illustrating a process executed by the platform portal server 3.

First, with reference to FIG. 12, the platform portal server 3 first executes a process of generating an account (contract account) on the blockchain network 7 to enable recording of an exhibition and a purchase of the artwork in the blockchain network 7. Specifically, the platform portal server 3 transmits a transaction including a contract code to the blockchain network 7 (step S1) and acquires an address of the contract account generated as a result of the transmission (step S2).

Subsequently, the platform portal server 3 repeatedly executes a process of determining whether or not exhibition of artwork is received from the artist terminal 4 (step S3), a process of determining whether or not a purchase request of the artwork is received from the purchaser terminal 5 (step S4), a process of checking whether or not an unauthorized use discovery report is recorded in the blockchain network 7 (step S5), and a process of determining whether or not an authenticity determination request of the artwork is received from the third party terminal 6 (step S6).

In a case where the platform portal server 3 determines, in step S3, that the exhibition of artwork is received, the platform portal server 3 executes an artwork exhibition process (step S7). In a case where the platform portal server 3 determines, in step S4, that the purchase request of the artwork is received, the platform portal server 3 executes an artwork sale process (step S8). In a case where the platform portal server 3 determines, in step S5, that the unauthorized use discovery report is recorded, the platform portal server 3 executes a reward payment process (step S9). In a case where the platform portal server 3 determines, in step S6, that the authenticity determination request of the artwork is received, the platform portal server 3 executes an authenticity determination process (step S10).

Figure 13:
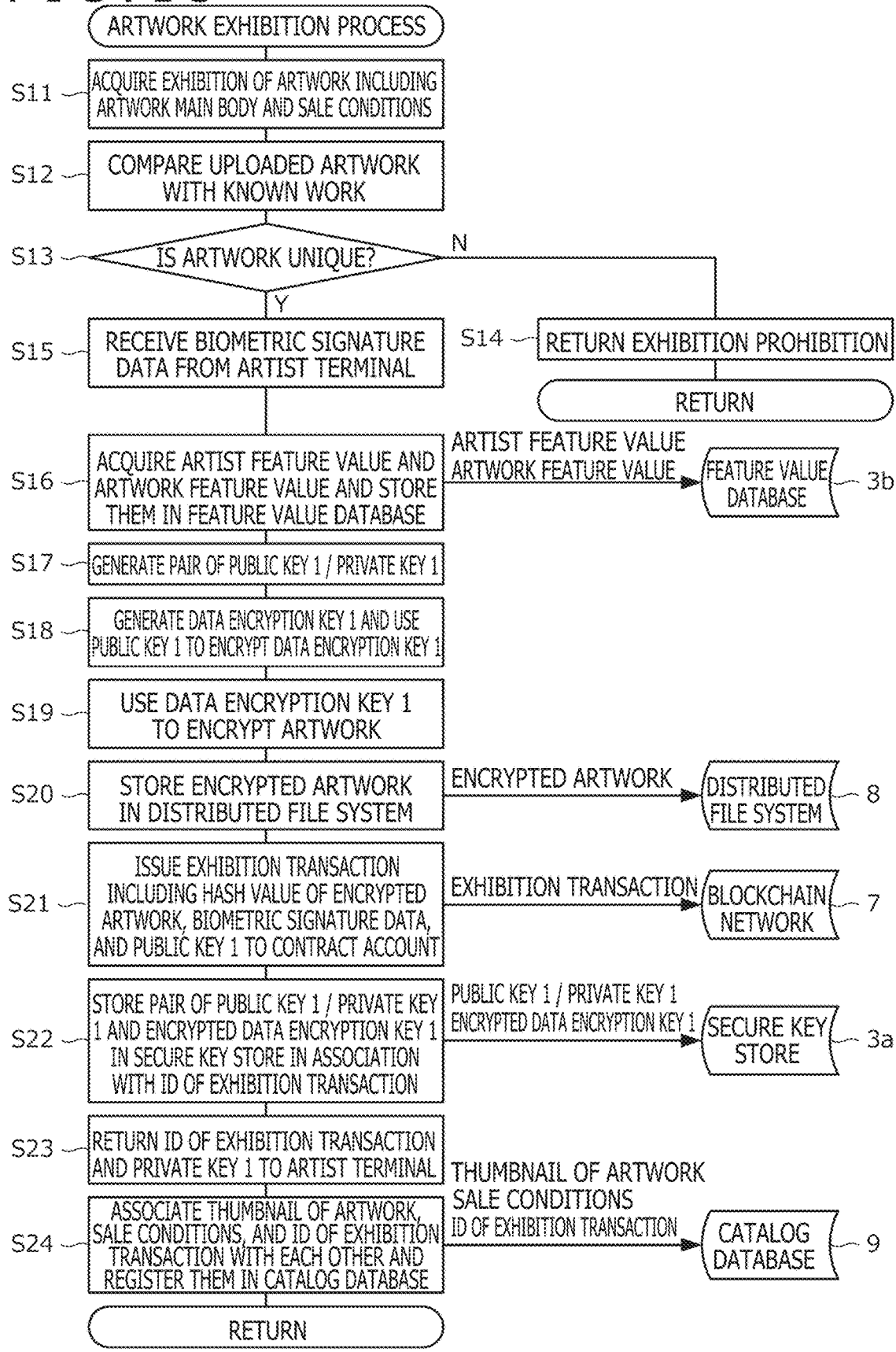
FIG. 13 is a diagram illustrating details of an artwork exhibition process executed in step S7 of FIG. 12.

FIG. 13 is a diagram illustrating details of the artwork exhibition process executed in step S7 of FIG. 12. As illustrated in FIG. 13, the platform portal server 3 that has started the artwork exhibition process acquires an exhibition of the artwork including the artwork itself and the sale conditions (step S11). The platform portal server 3 then compares the uploaded artwork and known work (step S12). The details of the comparison are as described above.

The platform portal server 3 determines whether or not the artwork is unique based on the result of the comparison executed in step S12 (step S13). As a result, in a case where the platform portal server 3 determines that the artwork is not unique, the platform portal server 3 returns an exhibition prohibition to the artist terminal 4 and ends the artwork exhibition process (step S14). On the other hand, in a case where the platform portal server 3 determines that the artwork is unique, the platform portal server 3 receives the biometric signature data from the artist terminal 4 (step S15). In a specific example, the platform portal server 3 prompts the artist to input the above-described dynamic signature data, by displaying a screen asking the artist to sign on the display of the artist terminal 4. To the dynamic signature data which has been input in this manner, the artist terminal 4 adds various pieces of information described with reference to FIG. 4 to thereby generate biometric signature data, and transmits the biometric signature data to the platform portal server 3.

Next, the platform portal server 3 acquires the artist feature value and the artwork feature value through the processes described above and stores the acquired artist feature value and artwork feature value in the feature value database 3*b* (step S16). The platform portal server 3 then generates a pair of a public key 1 and a private key 1 (step S17). In addition, the platform portal server 3 generates a data encryption key 1 and uses the public key 1 to encrypt the data encryption key 1 (step S18).

Subsequently, the platform portal server 3 uses the data encryption key 1 to encrypt the artwork (step S19) and stores the encrypted artwork in the distributed file system 8 (step S20). The platform portal server 3 then issues an exhibition transaction including the hash value of the encrypted artwork, the biometric signature data, and the public key 1 to the contract account generated in steps S1 and S2 of FIG. 12 (step S21).

The platform portal server 3 that has executed step S20 stores the pair of the public key 1 and the private key 1 and the data encryption key 1 encrypted in step S17 in the secure key store 3*a* in association with the ID of the issued exhibition transaction (step S22). The platform portal server 3 then returns the ID of the exhibition transaction and the private key 1 to the artist terminal 4 (step S23). The platform portal server 3 also associates the thumbnail of the artwork, the sale conditions, and the ID of the exhibition transaction with each other, registers them in the catalog database 9 (step S24), and ends the artwork exhibition process.

Figure 14:
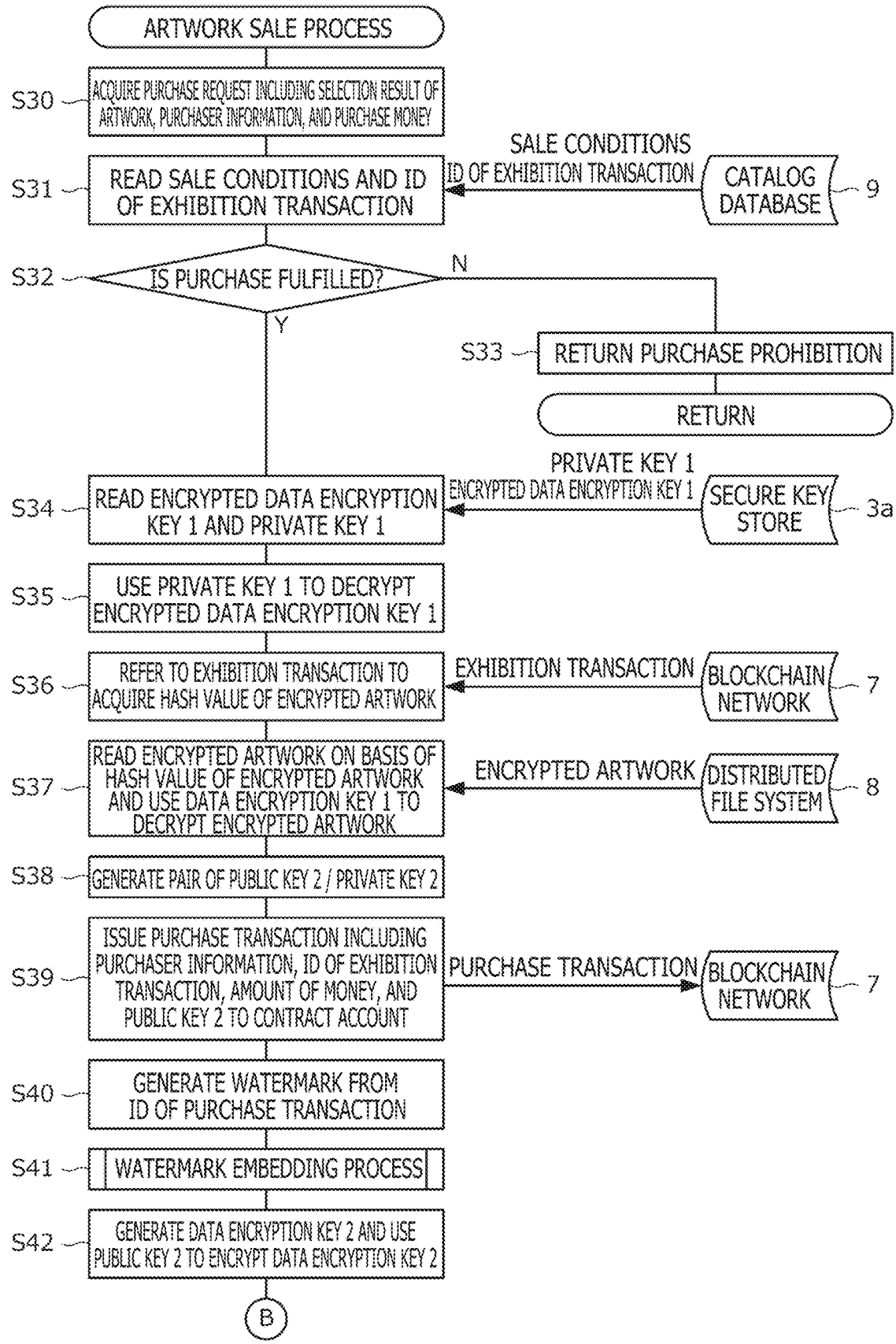
FIG. 14 is a diagram illustrating details of an artwork sale process executed in step S8 of FIG. 12.
Figure 15:
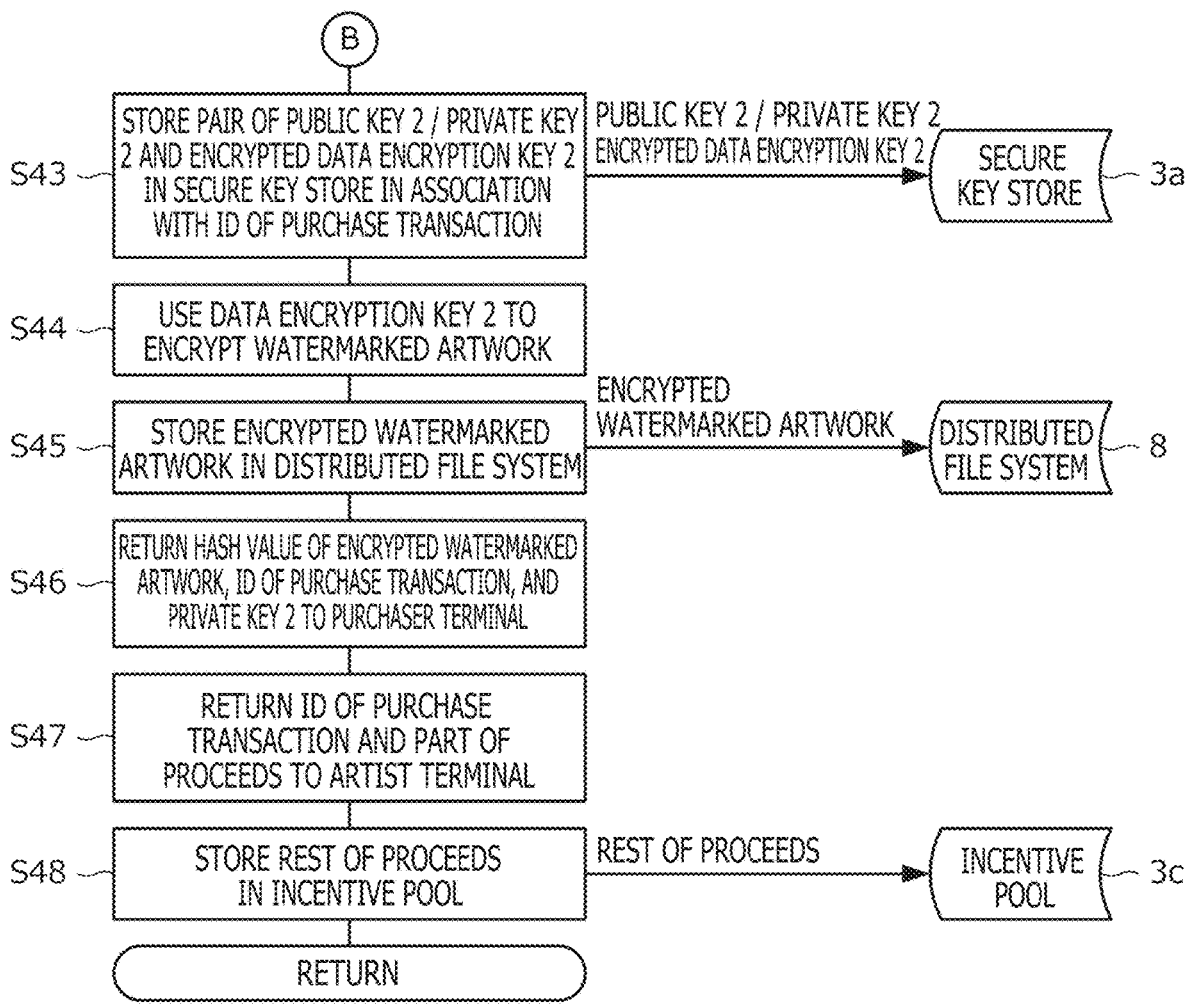
FIG. 15 is a diagram illustrating details of the artwork sale process executed in step S8 of FIG. 12.

FIGS. 14 and 15 are diagrams illustrating details of the artwork sale process executed in step S8 of FIG. 12. As illustrated in FIGS. 14 and 15, the platform portal server 3 that has started the artwork sale process acquires a purchase request including the selection result of the artwork in the catalog database 9 and including the purchaser information and the purchase price money (step S30). The platform portal server 3 then reads the sale conditions and the ID of the exhibition transaction from the catalog database 9 (step S31) and determines whether or not the purchase request can be fulfilled (step S32). The details of the determination are as described above.

In a case where the platform portal server 3 determines, in step S32, that the purchase cannot be fulfilled, the platform portal server 3 returns a purchase prohibition to the purchaser terminal 5 and ends the artwork sale process (step S33). On the other hand, in a case where the platform portal server 3 determines that the purchase can be fulfilled, the platform portal server 3 first reads the private key 1 and the encrypted data encryption key 1 from the secure key store 3*a* on the basis of the ID of the exhibition transaction (step S34) and uses the read private key 1 to decrypt the read encrypted data encryption key 1 (step S35).

Next, the platform portal server 3 refers to the exhibition transaction in the blockchain network 7 to acquire the hash value of the encrypted artwork (step S36). The platform portal server 3 then reads the encrypted artwork from the distributed file system 8 on the basis of the acquired hash value and uses the data encryption key 1 acquired in step S35 to decrypt the encrypted artwork (step S37).

Next, the platform portal server 3 generates a pair of a public key 2 and a private key 2 (step S38). The platform portal server 3 then issues a purchase transaction including the purchaser information, the ID of the exhibition transaction, the amount of money, and the public key 2 to the contract account generated in steps S1 and S2 of FIG. 12 (step S39).

Next, the platform portal server 3 generates a watermark from the ID of the purchase transaction (step S40) and executes a watermark embedding process to embed the generated watermark into the artwork (step S41).

FIG. 16 is a diagram illustrating details of the watermark embedding process executed in step S41 of FIG. 14. Note that, in the following description, the watermark is a QR code (registered trademark). In addition, although a case of an approach (SVD Based Approach) using SVD (Singular Value Decomposition) is illustrated as an example in FIG. 16, another approach may be used to execute the watermark embedding process. Examples of such approach include an approach (Optimal DCT-Psychovisual Threshold) using DCT (Discrete Cosine Transform), an approach using encoding in a YCbCr color space (YCbCr Colour Space Encoding Approach), and an approach using multi-resolution analysis (Multi-resolution Wavelet Decomposition).

As illustrated in FIG. 16, the platform portal server 3 first acquires a QR code (registered trademark) $W=(w_1, w_2, \ldots, w_{n\times n})$ of n×n bits that is a watermark (step S50). $w_1, w_2, \ldots w_{n\times n}$ are each a value 0 or 1.

Next, the platform portal server 3 acquires a predetermined robustness factor o (step S51). The larger the robustness factor o, the higher the recoverability of the embedded QR code (registered trademark). On the other hand, the larger the robustness factor o, the lower the image quality of the watermarked artwork. Therefore, it is preferable to take into account the recoverability of the QR code (registered trademark) and the image quality of the watermarked artwork to set an optimal value of o in advance.

Subsequently, the platform portal server 3 separates the artwork of m×m bits into three images I1, I2, and I3 by color channels (for example, red, green, and blue of RGB color model) (step S52). The platform portal server 3 then selects the image with the highest entropy (that is, the most homogeneous image with little difference) among the images I1, I2, and I3 (step S53). In the described example, the entropy of the image I1 is the highest, and the image I1 is selected in step S53.

The platform portal server 3 that has selected the image I1 divides the image I1 into non-overlapping blocks B(j) of 4×4 bits each (step S54). Here, 1≤j≤(m/4)×(m/4) holds.

Next, the platform portal server 3 uses a predetermined seed to generate n×n pseudo-random sequences P=($p_1$, $p_2$, . . . , $p_{n \times n}$) that do not overlap (step S55). Here, 1≤ $p_k$≤(m/4)×(m/4) holds. The platform portal server 3 then executes a process of steps S57 to S60 for each of integers k equal to or greater than 1 and equal to or smaller than n×n (step S56).

The process of steps S57 to S60 will be specifically described. The platform portal server 3 first selects a $p_k$-th block B($p_k$) (step S57). Next, the platform portal server 3 acquires a 4×4 diagonal matrix S($p_k$)=diag($s_1$, $s_2$, $s_3$, $s_4$) obtained by singular value decomposition of the selected block B($p_k$) (step S58). Note that the singular value decomposition is expressed by B($p_k$)=U($p_k$)S($p_k$)V($p_k$)$^T$. Here, U($p_k$) and V($p_k$) are each a 4×4 unitary matrix.

The platform portal server 3 then uses the robustness factor o and the bits $w_k$ to operate the diagonal matrix S($p_k$) to derive a 4×4 diagonal matrix S'($p_k$)=diag($s_1$, $s_2$+o×$w_K$, $s_2$, $s_3$×0.1) (step S59). The platform portal server 3 then uses the derived S'($p_k$) to execute reverse processing of the singular value decomposition to generate WB($p_k$) (step S60). Specifically, the platform portal server 3 performs calculation of WB($p_k$)=U($p_k$)S'($p_k$)V($p_k$)$^T$ to generate WB($p_k$).

Once all of the process of steps S57 to S60 is completed, the platform portal server 3 uses the generated n×n pieces of WB(j), and (m/4)×(m/4)−n×n blocks B(j) not selected in step S57, to generate an image I1' (step S61). Specifically, the platform portal server 3 replaces n×n blocks B($p_1$) to B($p_{n \times n}$), out of the (m/4)×(m/4) blocks B(j) included in the image 11, with WB($p_1$) to WB($p_{n \times n}$), respectively, to generate the image I1'.

Lastly, the platform portal server 3 uses the image I1' and the images I2 and I3 to generate watermarked artwork (step S62). Specifically, the platform portal server 3 combines the images I1', I2, and I3 to generate the watermarked artwork.

FIG. 14 will be further described. The platform portal server 3 which has finished the watermark embedding process generates a data encryption key 2 and uses the public key 2 to encrypt the data encryption key 2 (step S42). The platform portal server 3 then stores the pair of the public key 2 and the private key 2 and the encrypted data encryption key 2 in the secure key store 3a in association with the ID of the purchase transaction as illustrated in FIG. 15 (step S43).

Next, the platform portal server 3 uses the data encryption key 2 to encrypt the watermarked artwork (step S44) and stores the encrypted watermarked artwork in the distributed file system 8 (step S45). Subsequently, the platform portal server 3 returns the hash value of the encrypted watermarked artwork, the ID of the purchase transaction, and the private key 2 to the purchaser terminal 5 (step S46) and returns the ID of the purchase transaction and a part of the proceeds to the artist terminal 4 (step S47). In addition, the platform portal server 3 further stores the rest of the proceeds in the incentive pool 3c (step S48) and ends the artwork sale process.

Here, a watermark reading process for reading the watermark from the watermarked artwork will be described with reference to FIG. 17. FIG. 17 illustrates a process for reading the watermark from the watermarked artwork generated in the watermark embedding process illustrated in FIG. 16.

However, in a case where another type of watermark reading process is used to generate the watermarked artwork, it is obvious that a reading process corresponding to the process is necessary. In addition, although the platform portal server 3 executes the watermark reading process in the following description, another computer may execute the watermark reading process.

The platform portal server 3 first acquires a predetermined robustness factor o (step S70). It is preferable that the value of the robustness factor o be the same as the value of the robustness factor o acquired in step S51 of FIG. 16.

Next, the platform portal server 3 separates the watermarked artwork of m×m bits into three images I1, I2, and I3 by color channels (step S71). The platform portal server 3 then selects the image with the highest entropy among the images I1, I2, and I3 (step S72). The process of steps S71 and S72 is the same as the process of steps S52 and S53 of FIG. 16. In the description here, the entropy of the image I1 is also the highest, and the image I1 is selected in step S72.

The platform portal server 3 that has selected the image 11 divides the image I1 into non-overlapping blocks B(j) of 4×4 bits each (step S73). Here, 1≤j≤ (m/4)×(m/4) holds. The process is also the same as the process of step S54 in FIG. 16.

Next, the platform portal server 3 uses a predetermined seed to generate n×n pseudo-random sequences P=($p_1$, $p_2$, . . . , $p_{n \times n}$) that do not overlap (step S74). Here, 1≤$p_k$≤(m/4)×(m/4) holds. The predetermined seed used in step S74 needs to be the same as the seed used in step S55 of FIG. 16. The QR code (registered trademark) cannot be read if the seed is not known, and therefore, the seed functions also as a kind of common key.

Next, the platform portal server 3 executes a process of steps S76 to S79 for each of integers k equal to or greater than 1 and equal to or smaller than n×n (step S75).

The process of steps S76 to S79 will be specifically described. The platform portal server 3 first selects a $p_k$-th block B($p_k$) (step S76). Next, the platform portal server 3 acquires a 4×4 diagonal matrix S'($p_k$)=diag($s_1$, $s_2$', $s_3$', $s_4$') obtained by singular value decomposition of the selected block B($p_k$) (step S77). The singular value decomposition is expressed by B($p_k$)=U($p_k$)S'($p_k$)V($p_k$)$^T$ as in step S58 of FIG. 16.

Next, the platform portal server 3 derives $s_2$'-$s_3$' (step S78). The value derived in this way is equal to o×$w_k$ as is apparent from the derivation method of the diagonal matrix S'($p_k$) described in step S59 of FIG. 16. Therefore, the platform portal server 3 puts 1 into $w_k$ if the derived value is equal to or greater than o/2 (o×$w_k$≥o/2) and puts 0 into $w_k$ otherwise (step S79). In this way, k-th $w_k$ is read.

Once all of the process of steps S76 to S79 is completed, the platform portal server 3 acquires a QR code (registered trademark) W=($w_1$, $w_2$, . . . , $w_{n \times n}$) of n×n bits on the basis of the read n×n pieces of $w_k$ (step S80). This completes reading of the QR code (registered trademark) W that is a watermark.

FIG. 18 is a diagram illustrating details of an unauthorized use monitoring process executed by the plug-in installed on the browser software of the third party terminal 6 as a condition for the reward payment process executed in step S9 of FIG. 12. As illustrated in FIG. 18, the plug-in first determines whether or not a website is loaded (step S90) and extracts images from the loaded website in a case where the plug-in determines that the website is loaded (step S91). The plug-in then determines whether or not there is an unchecked image (that is, an image that has not been subject to a process of steps S93 to S101 described later) among the extracted images (step S92). In a case where the plug-in determines, in step S90, that the website is not loaded and in a case where the plug-in determines, in step S92, that there is no unchecked image, the plug-in returns to step S90 and repeats the process.

The plug-in that has determined, in step S92, that there is an unchecked image executes a process of steps S94 to S101 for each of one or more unchecked images (step S93).

Specifically, the plug-in first extracts the image ID from the image (step S94). Here, if the plug-in cannot extract the image ID, the plug-in moves the process onto the next image. On the other hand, in a case where the plug-in can extract the image ID, the plug-in refers to the blockchain network 7 to check whether or not there is a purchase contract (purchase transaction) including the extracted image ID (step S96). The plug-in then determines whether or not there is a purchase contract including the extracted image ID on the basis of the result of the check (step S97).

The plug-in, which has determined in step S97 that there is a purchase contract, moves the process onto the next image. On the other hand, the plug-in that has determined, in step S97, that there is no purchase contract first blocks the display of the site (step S98). The block can be performed by, for example, displaying a warning covering the entire screen of the browser software.

Next, the plug-in refers to the blockchain network 7 to check whether or not there is an unauthorized use report (report transaction) corresponding to the image ID extracted in step S94 (step S99). The plug-in then determines whether or not there is an unauthorized use report including the image ID extracted in step S94, on the basis of the result of the check (step S100).

The plug-in, which has determined in step S100 that there is an unauthorized use report, moves the process onto the next image without making a new report. On the other hand, the plug-in that has determined, in step S100, that there is no unauthorized use report issues a report transaction including the image ID, the address and the content of the website, and the date of the discovery of the unauthorized use to the contract account generated in steps S1 and S2 of FIG. 12 (step S101) and moves the process onto the next image. After the process is finished for all of the one or more unchecked images, the plug-in returns to step S90 and continues the process. In this way, the plug-in continues to monitor unauthorized use of the artwork while the browser software is launched in the third party terminal 6.

FIG. 19 is a diagram illustrating details of the reward payment process executed in step S9 of FIG. 12. As illustrated in FIG. 19, the platform portal server 3 that has started the reward payment process takes out the newly recorded report transaction from the blockchain network 7 and refers to the newly recorded report transaction to specify the third party terminal 6 and the image ID (step S110).

Next, the platform portal server 3 takes out the virtual currency corresponding to the specified image ID from the incentive pool 3c (step S111). The calculation method of the amount of virtual currency to be taken out is as described above. Lastly, the platform portal server 3 transmits the virtual currency taken out in step S111 to the third party terminal specified in step S110 (step S112) and ends the reward payment process.

FIG. 20 is a diagram illustrating details of the authenticity determination process executed in step S10 of FIG. 12. As illustrated in FIG. 20, the platform portal server 3 that has started the authenticity determination process first acquires the artwork to be determined, the artist information, and the information that specifies the artwork to be compared from the authenticity determination request (step S120). The content of the information is as described above.

Next, the platform portal server 3 acquires the above-described artist feature value and artwork feature value regarding the artwork to be determined (step S121). The platform portal server 3 further reads the artist feature value corresponding to the artist information from the feature value database 3b (step S122) and reads the artwork feature value corresponding to the artwork to be compared from the feature value database 3b (step S123).

Subsequently, the platform portal server 3 performs comparison of the artist feature value and the artwork feature value, respectively, to determine the authenticity of the artwork to be determined (step S124), and returns the result of the determination to the third party terminal 6 (step S125). The platform portal server 3 then ends the authenticity determination process.

As described above, according to the artwork trade and management system 1 of the present embodiment, the plug-in to the browser software of the third party terminal 6 automatically discovers and reports the unauthorized use of the artwork on the website. Therefore, unauthorized reproduction (use) of artwork can be suppressed, while accessibility of the artwork is maintained.

Further, a reward can be provided to the third party terminal 6 that has generated the report, and this can provide an incentive to the user of the third party terminal 6 to continue operating the plug-in according to the present invention.

In addition, the third party terminal 6 issues the report transaction after checking whether or not the report transaction regarding the same image ID already exists, and this can prevent mass generation of report transactions.

Moreover, the artist feature value and the artwork feature value of the exhibited artwork are acquired and stored in the feature value database, and this allows for subsequent determination of the authenticity of the artwork distributed in the market.

Although the preferred embodiment of the present invention has been described, the present invention is not limited to the embodiment in any way, and it is obvious that the present invention can be carried out in various embodiments without departing from the scope of the present invention.

For example, an artist feature value as metadata indicating a fingerprint of the artist may be added to the artwork. The addition can be executed by, for example, the feature value acquisition unit 13 illustrated in FIG. 6.

In addition, although the watermark is generated based on the ID of a purchase transaction in the example described in the embodiment, the watermark may be generated based on the artist feature value or the artwork feature value, in place of the watermark based on the ID of the purchase transaction or in addition to the watermark based on the ID of the purchase transaction, and the watermark may be embedded into the artwork to be transmitted to the purchaser terminal 5. Note that generation of the watermark based on the artist feature value or the artwork feature value can be executed by, for example, the watermark generation unit 36 illustrated in FIG. 7. In addition, embedding of the generated watermark can be executed by, for example, the watermark embedding processing unit 37 illustrated in FIG. 7.

DESCRIPTION OF REFERENCE SYMBOLS

1: Artwork trade and management system
2: Network
3: Platform portal server

3a: Secure key store
3b: Feature value database
3c: Incentive pool
4: Artist terminal
5: Purchaser terminal
6: Third party terminal
7: Blockchain network
8: Distributed file system
9: Catalog database
11, 30, 70: Reception unit
12: Duplicate determination unit
13: Feature value acquisition unit
14: Artwork encryption processing unit
15: Artwork storage processing unit
16: Key pair generation unit
17: Transaction issue unit
18: Key encryption processing unit
19: Catalog generation unit
20, 41, 62, 74: Transmission unit
31: Purchase availability determination unit
32: Key decryption processing unit
33: Artwork decryption processing unit
34: Key pair generation unit
35: Transaction issue unit
36: Watermark generation unit
37: Watermark embedding processing unit
38: Artwork encryption processing unit
39: Artwork storage processing unit
40: Key encryption processing unit
50: Image extraction unit
51: Artwork detection unit
52: Purchase history determination unit
53: Report existence determination unit
54: Report unit
60: Report acquisition unit
61: Reward amount determination unit
71: Feature value acquisition unit
72: Feature value reading unit
73: Authenticity determination unit
100: Computer
101: CPU
102: Storage apparatus
103: Input apparatus
104: Output apparatus
105: Communication apparatus
P: Pen
θ: Azimuth
σ: Robustness factor
Φ: Tilt angle
ψ: Angle of rotation

The invention claimed is:

1. A server used in a system for monitoring unauthorized use of digital artwork displayed on a website, the server configured to:
receive, from a terminal, an authenticity determination request regarding a target artwork displayed on a website, wherein the authenticity determination request includes artist information regarding an artist associated with the target artwork;
input one or more values included in stroke data associated with the target artwork to a machine learning model, wherein the machine learning model is generated based on training an artificial intelligence (AI) program with the one or more values which indicate features of artwork of the artist and which are included in stroke data of at least one reference artwork associated with the same artist;
wherein the one or more values are indicative of at least one of an average value and a dispersion of brush stroke speed, an average value and a dispersion of a pen pressure value, an average value and a dispersion of pen angle data, or time allocation of a pen touch state and a pen hover state;
acquire a target artist feature value associated with the target artwork, which is output from the machine learning model;
determine authenticity of the target artwork by comparing the acquired target artist feature value and a reference artist feature value previously determined by the machine learning model that was trained with the stroke data of at least one reference artwork associated with the artist; and
provide a result of the determined authenticity of the target artwork to the terminal.

2. The server according to claim 1, further configured to:
receive, from the terminal, a report indicating discovery of unauthorized use of digital artwork displayed on a website; and
issue, to the terminal, a reward as a compensation for the report.

3. The server according to claim 1, wherein the target artwork is associated with a series of pen touch coordinates indicating positions of a pen touch and a series of pen up coordinates indicating positions of a pen up, and the server is configured to:
input the series of pen touch coordinates and the series of pen up coordinates associated with the target artwork to the machine leaning model, wherein the machine learning model is generated based on training the AI program with values which indicate features of artwork;
acquire a target artwork feature value associated with the target artwork, which is output from the machine leaning model;
determine authenticity of the target artwork by comparing the acquired target artwork feature value and a reference artwork feature value previously determined by the machine learning model that was trained with the stroke data of the reference artwork; and
provide a result of the determined authenticity of the target artwork to the terminal.

4. The server according to claim 3, configured to:
embed a watermark indicative of the target artwork feature value into the target artwork.

5. A method performed by a server used in a system for monitoring unauthorized use of digital artwork displayed on a website, the method comprising:
receiving, from a terminal, an authenticity determination request regarding a target artwork displayed on a website, wherein the authenticity determination request includes artist information regarding an artist associated with the target artwork;
inputting one or more values included in stroke data associated with the target artwork to a machine learning model, wherein the machine learning model is generated based on training an artificial intelligence (AI) program with the one or more values which indicate features of artwork of the artist and which are included in stroke data of at least one reference artwork associated with the same artist;
wherein the one or more values are indicative of at least one of an average value and a dispersion of brush stroke speed, an average value and a dispersion of a pen pressure value, an average value and a dispersion of pen angle data, or time allocation of a pen touch state and a pen hover state;

acquiring a target artist feature value associated with the target artwork, which is output from the machine learning model;

determining authenticity of the target artwork by comparing the acquired target artist feature value and a reference artist feature value previously determined by the machine learning model that was trained with the stroke data of at least one reference artwork associated with the artist; and providing a result of the determined authenticity of the target artwork to the terminal.

6. The method according to claim 5, comprising:

receiving, from the terminal, a report indicating discovery of unauthorized use of digital artwork displayed on a website; and issuing, to the terminal, a reward as a compensation for the report.

7. The method according to claim 5, wherein the target artwork is associated with a series of pen touch coordinates indicating positions of a pen touch and a series of pen up coordinates indicating positions of a pen up, the method comprising:

inputting the series of pen touch coordinates and the series of pen up coordinates associated with the target artwork to the machine leaning model, wherein the machine learning model is generated based on training the AI program with values which indicate features of artwork;

acquiring a target artwork feature value associated with the target artwork, which is output from the machine leaning model;

determining authenticity of the target artwork by comparing the acquired target artwork feature value and a reference artwork feature value previously determined by the machine learning model that was trained with the stroke data of the reference artwork; and providing a result of the determined authenticity of the target artwork to the terminal.

8. The method according to claim 7, comprising:

embedding a watermark indicative of the target artwork feature value into the target artwork.

9. A computer-readable non-transitory medium including computer-executable instructions which, when executed by a server used in a system for monitoring unauthorized use of digital artwork displayed on a website, cause the server to perform:

receiving, from a terminal, an authenticity determination request regarding a target artwork displayed on a website, wherein the authenticity determination request includes artist information regarding an artist associated with the target artwork;

inputting one or more values included in stroke data associated with the target artwork to a machine learning model, wherein the machine learning model is generated based on training an artificial intelligence (AI) program with the one or more values which indicate features of artwork of the artist and which are included in stroke data of at least one reference artwork associated with the same artist;

wherein the one or more values are indicative of at least one of an average value and a dispersion of brush stroke speed, an average value and a dispersion of a pen pressure value, an average value and a dispersion of pen angle data, or time allocation of a pen touch state and a pen hover state;

acquiring a target artist feature value associated with the target artwork, which is output from the machine learning model;

determining authenticity of the target artwork by comparing the acquired target artist feature value and a reference artist feature value previously determined by the machine learning model that was trained with the stroke data of at least one reference artwork associated with the artist; and providing a result of the determined authenticity of the target artwork to the terminal.

10. The computer-readable non-transitory medium according to claim 9, wherein the computer-executable instructions, when executed, cause the server to perform:

receiving, from the terminal, a report indicating discovery of unauthorized use of digital artwork displayed on a website; and issuing, to the terminal, a reward as a compensation for the report.

11. The computer-readable non-transitory medium according to claim 9, wherein the target artwork is associated with a series of pen touch coordinates indicating positions of a pen touch and a series of pen up coordinates indicating positions of a pen up, and the computer-executable instructions, when executed, cause the server to perform:

inputting the series of pen touch coordinates and the series of pen up coordinates associated with the target artwork to the machine leaning model, wherein the machine learning model is generated based on training the AI program with values which indicate features of artwork;

acquiring a target artwork feature value associated with the target artwork, which is output from the machine leaning model;

determining authenticity of the target artwork by comparing the acquired target artwork feature value and a reference artwork feature value previously determined by the machine learning model that was trained with the stroke data of the reference artwork; and providing a result of the determined authenticity of the target artwork to the terminal.

12. The computer-readable non-transitory medium according to claim 11, wherein the computer-executable instructions, when executed, cause the server to perform:

embedding a watermark indicative of the target artwork feature value into the target artwork.

* * * * *